(12) United States Patent
Abhishek Raja et al.

(10) Patent No.: US 12,223,202 B2
(45) Date of Patent: Feb. 11, 2025

(54) STORE BUFFER

(71) Applicant: Arm Limited, Cambridge (GB)

(72) Inventors: Abhishek Raja, Austin, TX (US); Balaji Vijayan, Austin, TX (US); Alexander Cole Shulyak, Austin, TX (US)

(73) Assignee: Arm Limited, Cambridge (GB)

( * ) Notice: Subject to any disclaimer, the term of this patent is extended or adjusted under 35 U.S.C. 154(b) by 319 days.

(21) Appl. No.: 17/693,817

(22) Filed: Mar. 14, 2022

(65) Prior Publication Data

US 2023/0289092 A1 Sep. 14, 2023

(51) Int. Cl.
*G06F 12/00* (2006.01)
*G06F 3/06* (2006.01)

(52) U.S. Cl.
CPC .......... *G06F 3/0656* (2013.01); *G06F 3/0604* (2013.01); *G06F 3/0673* (2013.01)

(58) Field of Classification Search
CPC ..... G06F 3/0604; G06F 3/0656; G06F 3/0673
USPC ........................................................ 711/154
See application file for complete search history.

(56) References Cited

U.S. PATENT DOCUMENTS

| | | | | |
|---|---|---|---|---|
| 6,694,424 B1* | 2/2004 | Keller | ................... | G06F 9/3838 |
| | | | | 712/216 |
| 8,627,047 B2* | 1/2014 | Tsai | ...................... | G06F 9/3826 |
| | | | | 712/225 |
| 2012/0137109 A1* | 5/2012 | Ramani | ................. | G06F 9/3826 |
| | | | | 712/216 |
| 2014/0215190 A1* | 7/2014 | Mylius | .................. | G06F 9/3836 |
| | | | | 712/220 |
| 2015/0089186 A1* | 3/2015 | Kim | ...................... | G06F 9/3842 |
| | | | | 711/213 |
| 2015/0121010 A1* | 4/2015 | Kaplan | ................. | G06F 9/3834 |
| | | | | 711/125 |
| 2017/0109165 A1* | 4/2017 | Batley | ................. | G06F 9/30145 |
| 2020/0394039 A1* | 12/2020 | Kesiraju | ............... | G06F 9/3842 |
| 2021/0049015 A1* | 2/2021 | Chou | .................. | G06F 9/30043 |
| 2022/0027459 A1* | 1/2022 | Favor | ...................... | G06F 21/54 |
| 2022/0027460 A1* | 1/2022 | Favor | .................... | G06F 9/3838 |
| 2022/0100665 A1* | 3/2022 | Kotra | ...................... | G06F 9/383 |
| 2022/0358209 A1* | 11/2022 | Favor | .................... | G06F 9/3826 |

(Continued)

*Primary Examiner* — Mohamed M Gebril
(74) *Attorney, Agent, or Firm* — NIXON & VANDERHYE P.C.

(57) ABSTRACT

An apparatus comprises processing circuitry to issue store operations to store data to a data store and load operations to load data from the data store and a store buffer comprising entries to store entry information corresponding to store operations in advance of the store operations completing. Store buffer lookup circuitry is provided to lookup, in response to a load operation, whether the store buffer contains a corresponding entry corresponding to an older store operation for which target addresses of the load operation and the older store operation satisfy an address comparison condition. The store buffer lookup circuitry is configured to perform store-to-load forwarding in response to the load operation when the corresponding entry is a first type of store buffer entry satisfying a forwarding condition, and delay processing of the load operation when the corresponding entry is a second type of store buffer entry satisfying the forwarding condition.

19 Claims, 11 Drawing Sheets

(56) References Cited

U.S. PATENT DOCUMENTS

2022/0358210 A1\* 11/2022 Favor ..................... G06F 21/52
2022/0382549 A1\* 12/2022 Battle ................... G06F 9/3858

\* cited by examiner

| FAST | | | | SLOW | | | |
|---|---|---|---|---|---|---|---|
| valid | PA | write data | attributes | valid | PA | write data | attributes |
| | | | | | | | |
| | | | | | | | |
| | | | | | | | |
| | | | | | | | |

000
001
010
011

Entries indexed using STID non-wrap bits 160

⎫
⎬ 140
⎭  (FAST)

⎫
⎬ 142
⎭  (SLOW)

FIG. 3

STORE BUFFER

BACKGROUND

Technical Field

The present technique relates to the field of data processing.

Technical Background

A data processing apparatus may support store operations for storing data to a data store and load operations for loading data from a data store. The apparatus may provide a store buffer, in which information corresponding to a store operation is stored in advance of the store operation completing to the data store.

SUMMARY

Viewed from one aspect, the present technique provides an apparatus comprising:
  processing circuitry to issue store operations to store data to a data store and load operations to load data from the data store;
  a store buffer comprising entries to store entry information corresponding to store operations in advance of the store operations completing; and
  store buffer lookup circuitry to lookup, in response to a load operation, whether the store buffer contains a corresponding entry corresponding to an older store operation for which target addresses of the load operation and the older store operation satisfy an address comparison condition; in which:
  the store buffer lookup circuitry is configured to perform store-to-load forwarding in response to the load operation when the corresponding entry is a first type of store buffer entry and the corresponding entry satisfies a forwarding condition; and
  the store buffer lookup circuitry is configured to delay processing of the load operation when the corresponding entry is a second type of store buffer entry and the corresponding entry satisfies the forwarding condition.

Viewed from another aspect, the present technique provides a method comprising:
  issuing store operations to store data to a data store and load operations to load data from the data store;
  storing, in a store buffer, entry information corresponding to store operations in advance of the store operations completing; and
  looking up, in response to a load operation, whether the store buffer contains a corresponding entry corresponding to an older store operation for which target addresses of the load operation and the older store operation satisfy an address comparison condition;
  performing store-to-load forwarding in response to the load operation when the corresponding entry is a first type of store buffer entry and the corresponding entry satisfies a forwarding condition; and
  delaying processing of the load operation when the corresponding entry is a second type of store buffer entry and the corresponding entry satisfies the forwarding condition.

Viewed from yet another aspect, the present technique provides a non-transitory computer-readable medium to store computer-readable code for fabrication of an apparatus comprising:
  processing circuitry to issue store operations to store data to a data store and load operations to load data from the data store;
  a store buffer comprising entries to store entry information corresponding to store operations in advance of the store operations completing; and
  store buffer lookup circuitry to lookup, in response to a load operation, whether the store buffer contains a corresponding entry corresponding to an older store operation for which target addresses of the load operation and the older store operation satisfy an address comparison condition; in which:
  the store buffer lookup circuitry is configured to perform store-to-load forwarding in response to the load operation when the corresponding entry is a first type of store buffer entry and the corresponding entry satisfies a forwarding condition; and
  the store buffer lookup circuitry is configured to delay processing of the load operation when the corresponding entry is a second type of store buffer entry and the corresponding entry satisfies the forwarding condition.

Further aspects, features and advantages of the present technique will be apparent from the following description of examples, which is to be read in conjunction with the accompanying drawings.

BRIEF DESCRIPTION OF THE DRAWINGS

FIG. 3 schematically illustrates a segmented store buffer.

DESCRIPTION OF EXAMPLES

Figure 1:
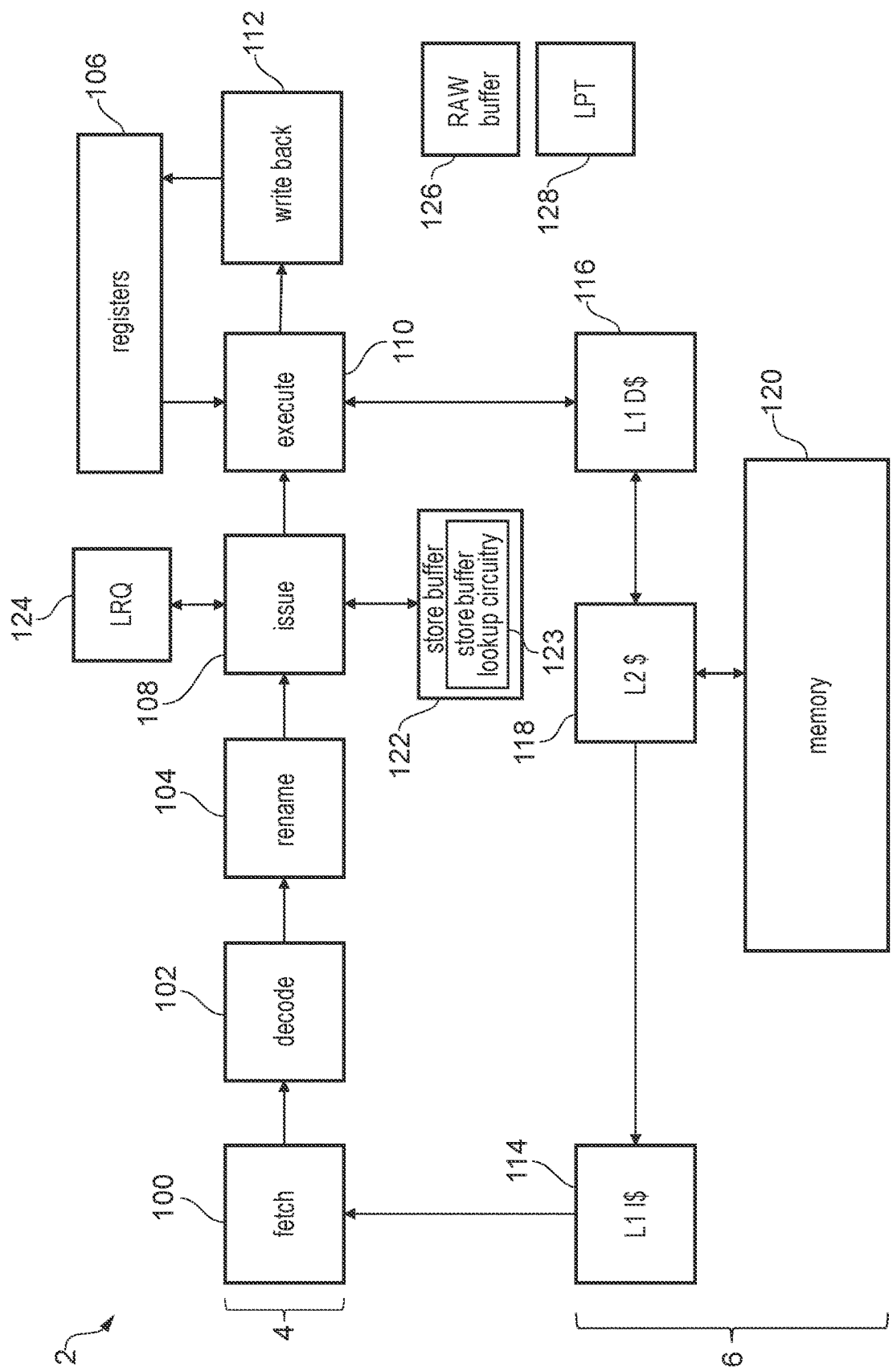
FIG. 1 schematically illustrates an example of a data processing apparatus.

An apparatus has processing circuitry to issue store operations to store data to a data store. The data store could be a cache or memory, for example. The processing circuitry also issues load operations to load data from the data store. The apparatus also has a store buffer. The store buffer provides entries to store information corresponding to store operations in advance of the store operations completing to the data store. For example, the store buffer may store information about the target address of the store. The store buffer can also store other attributes related to the store. The store buffer could also store the data, to be stored in the data store in response to a store operation (alternatively, the data itself could be stored in a separate store data buffer).

Providing a store buffer may be associated with improved performance. Entries in the store buffer may be used to buffer information corresponding to store operations that are not ready to complete to the data store, allowing other operations to be issued and reducing the need to stall the issue stage of the processing circuitry from issuing further operations.

The store buffer may also enable store-to-load forwarding (STLF) in which data to be written to the data store in response to an older store operation, stored in the store buffer, is used to enable a response to a load operation in advance of the store operation completing to the data store. This reduces the need to wait for the store operation to complete to the data store, which may be some time after the store operation is issued (for example, if the store operation involves storing data to a shared cache line not already held by the cache, the processing circuitry may need to obtain permission to write to the line according to a coherency scheme before being able to write to the cache, which may cause a delay due to snooping another processor's cache which might hold the data, for example).

The apparatus also has store buffer lookup circuitry. Following a store operation to a target address where information corresponding to the store operation has been stored in the store buffer, a load operation younger than the store operation may be issued to read data from a target address overlapping the target address of the earlier store operation (where "younger" is used to refer to operations that come later in the program order, i.e. the order in which instructions are fetched/decoded, not the order in which instructions are executed and likewise "older" refers to operations that come earlier in the program order). If the load operation were to read data from the target address in the data store, it would not read the most up-to-date data, as the most up-to-date data is instead stored in the store buffer. Therefore, store buffer lookup circuitry is provided to lookup whether the store buffer contains an entry corresponding to an older store operation for which target addresses of the load operation and the older store operation satisfy an address comparison condition. Therefore, the apparatus is able to determine whether the load operation should load data from the data store, or whether the most up-to-date data is stored in the store buffer. The address comparison condition does not require that the target address of the load operation and the target address of the store operation exactly match. For the address comparison condition to be satisfied, it may be sufficient that the region of memory addressed by the target address of the older store operation and the region of memory addressed by the target address of the load operation overlap.

If the store buffer lookup circuitry determines that the store buffer contains an entry for which the address comparison condition is satisfied, then in some cases it may be possible to return information in response to the load operation using the store buffer instead of the data store. For example, data may be returned from the store buffer in response to the load operation. This may be referred to as store-to-load forwarding (STLF).

In some cases, the store buffer lookup circuitry may determine that more than one entry in the store buffer corresponds to a store operation older than the load operation for which the target addresses of the load operation and the older store operation satisfy an address comparison condition. In this case, the entry which holds the most up-to-date information is the youngest store buffer entry that is older than the load operation and satisfies the address comparison condition. Therefore, the store buffer lookup circuitry may use age determination logic to determine which of the more than one entries corresponds to the youngest store operation that is older than the load operation. This may involve carrying out a sequential search in the store buffer, searching through entries older than the load operation in reverse age order, for example. STLF may then be carried out using information stored in the youngest older entry.

In some cases, even if the store buffer contains an entry corresponding to an older store operation for which target addresses of the load operation and the older store operation satisfy an address comparison condition, STLF may not be performed if a forwarding condition is not satisfied. The forwarding condition may take a variety of forms, but for example may include an address alignment condition. If the target address of the load operation and the target address of the older store operation overlap and therefore satisfy the address comparison condition but are not identical, the forwarding condition may only be satisfied for certain offsets. In one example, the address alignment condition may require the address range targeted by one of the load or store operations to start or end at an address that is a predetermined fraction of the way through the address range targeted by the other of the load or store operations. For example, the address alignment condition may be satisfied if the region of memory targeted by the load operation begins at an address that is at a position halfway between the start and end of the region of memory targeted by the older store operation. It will be appreciated that the predetermined fraction is not limited and may be ¼, ½, or ¾, for example. The required level of overlap could alternatively be a multiple of a predetermined number of bits.

Forwarding condition determination logic may be provided, for example in the store buffer lookup circuitry or processing circuitry, to determine whether a given entry satisfies the forwarding condition.

It is desirable to increase the number of entries provided in the store buffer. For example, increasing the number of store buffer entries reduces the likelihood that the processing pipeline will stall while waiting for a store buffer entry to become available. However, providing more entries in the store buffer may be associated with STLF logic taking an increased amount of time to handle STLF. For example, age determination logic to determine which corresponding entry is the youngest older corresponding entry may involve performing a series of comparisons between entries. The number of comparisons to perform is expected to increase as the number of store buffer entries increases. Hence, the age determination logic is expected to take longer to determine a youngest older entry as the number of store buffer entries increases. As the evaluation of the forwarding condition and the calculation of a forwarding vector (used to enable a load response by selecting data from the store buffer to be fed to the load result bus) depend on age determination logic first identifying the youngest corresponding entry older than the load operation, the results of the forwarding condition determination and forwarding vector calculation are also delayed by a time that depends on the number of store buffer entries.

Therefore, increasing the number of entries in a store buffer may increase the time taken to determine whether STLF is possible in response to a load operation and to generate a load response using STLF. Hence, in the store buffer described above there is a trade-off between the number of entries in the store buffer and STLF timing.

Recognising this problem, the present inventors have proposed a solution comprising a segmented store buffer. The segmented store buffer comprises two types of entry, a first type of entry and a second type of entry.

The store buffer lookup circuitry is configured to perform STLF in response to the load operation when the corresponding entry is a first type of store buffer entry and the corresponding entry satisfies a forwarding condition. This may involve determining the youngest older corresponding entry, evaluating the forwarding condition for the youngest older corresponding entry, and calculating a forwarding vector before returning a load response. In this manner, the first type of entry is involved in STLF in a similar way to the store buffer entries described above.

However, the store buffer lookup circuitry is configured to delay processing of the load operation when the corresponding entry is a second type of store buffer entry and the corresponding entry satisfies the forwarding condition. Hence, in response to a load operation, even if a store buffer entry corresponds to an older store operation for which target addresses of the load operation and the older store operation satisfy an address comparison condition, and the forwarding condition is satisfied, processing of the load operation may be delayed if the entry is a store buffer entry of the second type.

For STLF logic to maintain a certain level of performance, there may be timing constraints on steps in the process of returning a STLF response. For example, if an STLF response is started speculatively on identifying a corresponding entry, but before it has been determined whether or not the forwarding condition is satisfied, then there may be a timing constraint placed on the forwarding condition determination so that it is returned in time to allow the speculative STLF response to be cancelled if the forwarding condition is not satisfied. This timing constraint may indirectly place a constraint on age determination logic, so that the youngest older entry for which the forwarding condition is to be determined can be identified in time to enable the forwarding condition to be evaluated. Additionally, there may also be a timing constraint placed on the calculation of the forwarding vector so that the forwarding vector is calculated in time for an STLF response to be returned. When the time taken to complete steps in the STLF process increases (such as the time taken to identify the youngest older entry increasing with increasing number of store buffer entries) then this puts pressure on circuit timings, so that with a standard store buffer with all entries treated equally the performance of the STLF logic may decrease. For example, a clock frequency may be decreased to allow timing constrains to be met.

However, by delaying processing of the load operation for entries of the second type, entries of the second type may be added to a store buffer with a reduced impact on the maximum clock frequency that can be supported.

When the processing of a load operation is delayed for entries of a second type of store buffer entry, then age determination logic, forwarding condition logic, and forwarding vector calculation logic have more time to evaluate whether STLF can be performed, and prepare for STLF to be performed, for store buffer entries of the second type. STLF logic for store buffer entries of the second type can be moved off the critical path which means that the STLF logic for handling store buffer entries of the first type does not need to be slowed down to account for the time taken to handle STLF for store buffer entries of the second type. This puts less pressure on meeting timings at a given clock frequency, as there is no need to determine a youngest older corresponding entry, return the forwarding condition result, and calculate a forwarding vector within the same timing for all the store buffer entries.

Hence, adding entries of the second type to the store buffer can increase the capacity of the store buffer without increasing the number of entries for which SLTF logic needs to determine a youngest older corresponding entry, evaluate a forwarding condition, and prepare a forwarding vector within a given cycle. Therefore, the proposed technique can reduce the likelihood of a pipeline stall by increasing the capacity of a store buffer, while avoiding the performance costs associated with adding entries to a store buffer. The proposed technique therefore overcomes the trade-off between store buffer capacity and STLF timing.

In some embodiments, when the store buffer lookup circuitry determines that the youngest entry corresponding to a store operation older than the load operation for which target addresses of the load operation and the older store operation satisfy an address comparison condition is a second type of store buffer entry, the store buffer lookup circuitry may be configured to not perform STLF at all. Therefore, store buffer entries of the second type may be used to store information corresponding to store operations in advance of the store operations completing to a data store, but may not be used to return information in response to a load operation while the entry still resides in the store buffer. In this case, if a load operation is issued to a target address which satisfies an address comparison condition with a target address of a store operation corresponding to a store buffer entry of the second type, the apparatus may need to wait until the store operation has completed to the data store or wait until the store operation has been allocated to a first type of entry, before returning a response to the load operation.

In some embodiments, the store buffer lookup circuitry may be configured to replay the load operation when the corresponding entry is the second type of store buffer entry. Therefore, delaying processing of the load operation may comprise replaying the load operation. For example, the load operation may be delayed by signalling that the load is to be replayed when it is determined that an entry in the store buffer corresponding to a load operation is an entry of the second type. Information identifying the load operation to be replayed may then be placed in a load replay queue until the load operation has completed. Hence, delayed load operations may be replayed on the chance that on replay the corresponding entry is available for STLF.

In some embodiments, the store buffer lookup circuitry is configured to replay the load operation when the corresponding entry is the second type of store buffer entry and the corresponding entry satisfies the forwarding condition. By replaying load operations when the corresponding entry is the second type of store buffer entry and the corresponding entry satisfies the forwarding condition, and not replaying load operations when the corresponding entry is the second type of store buffer entry and the corresponding entry does not satisfy the forwarding condition, then it may be inferred that by replaying the load operation the older store operation corresponding to the entry hit on the initial load operation satisfies the forwarding condition. Therefore, replaying load operations for which the corresponding entry is a second type of store buffer entry that satisfies the forwarding condition (and not replaying those for which the forwarding condition is not satisfies) may enable STLF to be performed at a later point in processing even if when the load is replayed the load corresponds to a second type of store buffer entry. Determining whether or not the corresponding entry satisfies the forwarding condition may be carried out at any point before the load operation is replayed, but the determination does not need to be calculated as quickly for entries of the second type as for entries of the first type due to the delayed processing for loads which correspond to store buffer entries of the second type. This allows the timing of age determination logic, forwarding condition determination logic, and forwarding vector calculation logic for entries of the second type to not have a direct effect on clock frequency. Therefore, by replaying load operations when the corresponding entry is a store buffer of a second type that satisfies the forwarding condition, the second type of store buffer entries may be used for STLF while retaining the benefits of not affecting STLF timing for entries of the first type.

In response to a replayed load operation replayed due to the corresponding entry being the second type of store buffer entry that satisfies the forwarding condition, the store buffer lookup circuitry is configured to determine whether the store buffer contains a corresponding-on-replay entry which corresponds to an older store operation for which target addresses of the replayed load operation and the older store operation satisfy an address comparison condition. A load may be replayed for several reasons (such as losing cache arbitration) and therefore a mechanism may be provided to enable a load operation to be identified as one that has been replayed due to the corresponding entry being the second type of store buffer entry that satisfies the forwarding condition. For example, an identifier may be provided in the load replay queue which in one state indicates that the corresponding load has been replayed due to the corresponding entry being the second type of store buffer entry that satisfies the forwarding condition and in another state indicates that the load has been replayed for a different reason. In the time between the store buffer lookup performed in response to the initial load operation and the replayed load operation, entries may have been removed from the store buffer due to store operations completing to the data store. Also, new entries may have been added to the store buffer due to store operations issued after the initial load operation. These store operations may still be older than the initial load operation. The store buffer lookup circuitry may therefore perform a store buffer lookup in response to the replayed load operation, as the corresponding entry on the first lookup may no longer be in the store buffer, the corresponding entry on the first lookup may no longer be the youngest older entry corresponding to the load operation, or the older store operation corresponding to the corresponding entry on the first lookup may have been allocated to a different store buffer entry (e.g. migration of the older store operation from a second type of entry to a first type of entry as discussed further below).

If it is determined that a corresponding-on-replay entry is a store buffer entry of the second type, then age determination logic may be used to determine which entry is the youngest store buffer entry of the second type that corresponds to a store operation older than the load operation.

If it is determined that there are no corresponding-on-replay entries of the second type, then it is determined whether there is a corresponding-on-replay entry of the first type, and if so then which entry is the youngest corresponding-on-replay entry older than the load operation. Thereafter the situation may be the same as in the first lookup. That is, forwarding condition determination logic determines whether the entry can be used for STLF, forwarding vector calculation logic calculates a forwarding vector, and STLF may then be performed.

When the youngest corresponding-on-replay entry is a store buffer entry of the second type, it is determined whether the store buffer entry corresponds to the same store operation as the corresponding entry of the second type which caused the load operation to be replayed.

If the youngest corresponding-on-replay entry is a store buffer entry of the second type, but does not correspond to the same older store operation as the store buffer entry which satisfied the address comparison condition on the initial load operation, then it is not known whether or not the entry satisfies the forwarding condition, and therefore a new forwarding condition determination may be performed. In addition a new forwarding vector is calculated for the new youngest corresponding-on-replay entry which is a different entry to the previous entry for which the previous forwarding vector was calculated. These steps may not be completed in time to return a load response using STLF in response to the replayed load operation. Therefore, processing of the replayed load operation may be delayed. For example, the replayed load operation may be replayed again in a similar way to the initial pass for that load operation, with the forwarding condition determination logic evaluating the forwarding condition and calculating a new forwarding vector for the corresponding-on-replay entry before the replayed load operation is replayed again.

However, when the youngest corresponding-on-replay entry corresponds to the same older store operation as the store buffer entry of the second type which caused the load operation to be replayed, then the forwarding condition has already been evaluated and is known to be satisfied, as only load operations corresponding to store buffer entries of the second type that satisfy the forwarding condition are replayed. Therefore, the store buffer lookup circuitry may perform STLF without further evaluating the forwarding condition in response to the replayed load operation when the youngest corresponding-on-replay entry corresponds to the same older store operation as the corresponding entry of the second type which caused the load operation to be replayed. In addition, the forwarding vector has previously been calculated for the corresponding-on-replay entry as it is the same entry as the corresponding entry which caused the load operation to be replayed, and there is no need to recompute the forwarding vector. Therefore, STLF may be carried out using a previously calculated forwarding vector stored in a load replay queue for the replayed load.

Thus, STLF may be performed using entries of the second type according to the process described above comprising two or more passes.

If the store buffer lookup circuitry determines that there are no valid entries in the store buffer that satisfy the address comparison condition with the replayed load operation, then the store buffer lookup circuitry may determine that the store buffer does not contain a corresponding-on-replay entry. Therefore, the data in the data store at the target address of the load operation may be the latest data at that target address, and therefore data may be returned from the data store in response to the load operation. This may involve initiating a load response using data from the data store. Alternatively, the load response may be speculatively initiated in response to the issuing of the replayed load operation, and enabling load data to be returned from the data store may comprise not cancelling the speculative load response.

The store buffer lookup circuitry may be configured to determine whether the store buffer contains an entry corresponding to the same older store operation as the corresponding entry of the second type which caused the load operation to be replayed by comparing at least a subset of identifying information that was stored about the corresponding entry in response to the load operation for which processing was replayed against at least a subset of entry information corresponding to at least one store buffer entry of the second type, and when the compared information matches, determine that the store buffer contains the same corresponding entry of the second type which caused the load operation to be replayed.

For example, when the store buffer lookup circuitry determines that the store buffer contains a corresponding entry of the second type corresponding to an older store operation for which target addresses of the load operation and the older store operation satisfy an address comparison condition, it may store information identifying the corresponding entry of the second type. The information may include the store buffer identifier (STID), for example. Then, in response to the replayed load operation the store buffer lookup circuitry may compare at least a subset of the stored information with information corresponding to at least one store buffer entry of the second type. The comparison may be performed for each store buffer entry of the second type, but in some cases the comparison may only be performed for the youngest corresponding-on-replay entry of the second type. If it is determined that the compared information matches, the store buffer lookup circuitry can determine that the store buffer contains an entry corresponding to the same older store operation as the corresponding entry of the second type which caused the load operation to be replayed.

In one particular example, the STID of the corresponding entry is stored, representing the subset of identifying information about the corresponding entry to which the load operation corresponded on the first pass before being replayed. The stored STID is compared to a STID calculated for the corresponding-on-replay entry, and when the values match then it may be determined that the corresponding-on-replay entry is the same entry as the corresponding entry of the second type which caused the load operation to be replayed.

In some examples, the store buffer lookup circuitry may be configured to determine whether the corresponding entry satisfies the forwarding condition independently from signalling that a load operation is to be replayed. For example, the determination could begin and even end before signalling that the load operation is to be replayed. However, in some embodiments the store buffer lookup circuitry is configured to signal that the load operation for which the corresponding entry is an entry of the second type is to be replayed based on a match with any store buffer entry of the second type corresponding to an older store operation. The lookup to find any matching entry can be performed quickly (relative to the age determination logic, forwarding condition determination logic and forwarding vector calculation logic) and therefore may be performed while meeting timings for the STLF logic without reducing clock frequency. After replay is signalled it is determined which of the corresponding entries is the youngest older corresponding entry and whether the youngest older corresponding entry satisfies the forwarding condition. This allows the signalling of the replay to be done at a similar timing to the replay signalling that would be done if a load operation hit on a store buffer entry of the first type and the store buffer entry of the first type did not satisfy the forwarding condition, so that signalling a replay for load operations hitting on store buffer entries of the second type does not need to delay the logic for replaying that also handles signalling of replay for load operations that hit on store buffer entries of the first type. Hence, signalling replay before evaluating the forwarding condition for store buffer entries of the second type helps to avoid delaying signalling replay for load operations hitting on store buffer entries of the first type which do not satisfy the forwarding condition (see further discussion below of this outcome for the first type of store buffer entries), so there is no need to reduce clock frequency to accommodate the slower pace of the logic for evaluating the forwarding condition for store buffer entries of the second type, while sharing a replay mechanism between both types of store buffer entries.

In order to prevent replay in cases where the corresponding entry does not satisfy the forwarding condition (even though replay is signalled before the forwarding condition is evaluated), the store buffer lookup circuitry may be configured to trigger a flush operation to flush the load operation and younger operations from the processing circuitry when the forwarding condition is not satisfied. Hence, the store buffer lookup circuitry speculatively signals that the load operation is to be replayed before the forwarding condition determination is complete. When the forwarding condition is determined to be satisfied no further action may need to be taken as the load operation is already in the process of being replayed, and when the forwarding condition is determined to be not satisfied the load operation and any younger operations are flushed from the processing pipeline to prevent replaying of the load operation.

Flushing the pipeline may cause disruption to performance, and it is therefore desirable to avoid flushing the pipeline if possible. Hence, it may be desirable to prevent the re-execution of previously flushed load operations when it is known that the corresponding entry does not satisfy the forwarding condition and is still pending in an entry of the second type. If a given entry fails to satisfy the forwarding condition once, then it may be likely that it will fail to satisfy the forwarding condition in the future. Therefore, in some examples the processing circuitry is configured to store flushed load identifying information identifying the flushed load operation and the older store operation corresponding to the store buffer entry of the second type that fails to satisfy the forwarding condition, and use the stored flushed load identifying information to defer processing of a reissued load operation corresponding to the flushed load operation. Processing of the reissued load operation may be deferred for a predetermined amount of time or number of cycles, after which the corresponding entry should have left the store buffer or been transferred to a store buffer entry of the first type. Alternatively, processing of the reissued load operation may be deferred until the corresponding entry leaves the store buffer, and therefore until the load response may be returned from the data store. Alternatively, processing of the reissued load operation may be deferred until the older store operation is allocated to a first type of store buffer entry. As will be discussed below, in some cases an entry of the second type may be transferred to an entry of the first type. For entries of the first type, there is sufficient time to signal replay of the load operation when the forwarding condition is not satisfied, and so there is no risk of a pipeline flush. Therefore, the reissued load operation may no longer need to be deferred when the older store operation is allocated to a first type of store buffer entry.

In some examples, the number of store buffer entries of the first type is unrelated to the number of entries of the second type. However, to simplify age determination logic, each store buffer entry of the second type may be associated with a corresponding store buffer entry of the first type. Therefore, there may be at least as many store buffer entries of the first type as there are store buffer entries of the second type, so that each store buffer entry of the second type can be associated with a separate store buffer entry of the first type. In the case where information is transferred from a store buffer entry of the second type to a store buffer entry of the first type, the transfer logic is made simpler by only transferring the information from a store buffer entry of the second type to the corresponding store buffer entry of the first type. In some examples, there is a one-to-one association between store buffer entries of the first type and store buffer entries of the second type, such that there is the same number of entries of the first and second types.

Store buffer entries may be identified by a store buffer identifier (STID) comprising a number of wrap bits and a number of non-wrap bits. In some examples, the non-wrap bits are contiguous and in some examples the wrap bits are contiguous (so the non-wrap bits are adjacent to each other in order of significance, and the wrap bits are adjacent to each other when viewed in order of significance—it will be appreciated that here "contiguous" and "adjacent" refer to the significance of the bits within the numeric value represented, rather than the physical location of the storage elements storing those bits, which can be arranged differently from the logical position within the number represented). As above, each store buffer entry of the second type corresponds to a store buffer entry of the first type. The non-wrap bits may be used to identify a particular combination of first and second entries in the store buffer. For example, the non-wrap bits may be used to index into the store buffer to a region containing a first and second type of entry. Therefore, corresponding store buffer entries may have STIDs with identical non-wrap bits.

Both the wrap bits and non-wrap bits of the STID may be used to determine the relative age of two different STIDs. If the wrap bits of two STIDs are the same then relative age may be determined by comparing non-wrap bits. If the wrap bits of a given STID are incremented (or, in an alternative example, decremented) with respect to the wrap bits of another STID, then it can be determined regardless of the non-wrap bits that the given STID is younger or older than the other STID. Either or both of the wrap bits and non-wrap bits of the STID may be stored explicitly in the store buffer or in a structure associated with the store buffer. However, in some embodiments the arrangement of the store buffer, and the order of allocation to and deallocation from the store buffer may enable the wrap bits and non-wrap bits of the STID to be inferred. Avoiding explicitly storing STIDs may reduce overhead associated with the store buffer.

Some examples impose no restriction on the order in which store buffer entries are allocated. However, store buffer entries of the first type are able to be used in STLF in response to an initial load operation. Therefore, these may return a response faster than entries of the second type. As such, it may be desirable to prioritise allocating entries of the first type. Therefore, in some examples, the store buffer entries of the first type are allocated before store buffer entries of the second type. In some examples, the store buffer lookup circuitry is configured to transfer entry information stored in a store buffer entry of the second type to the corresponding store buffer entry of the first type when the store buffer entry of the first type becomes available. An entry might become available when the store operation is passed to the data store from the store buffer, or may become available when both the store operation and any older store operations have been passed to the data store from the store buffer. By providing each store buffer entry of the second type with a corresponding entry of the first type, then transferring entries can be performed simply and age determination logic can be made simpler, reducing overhead and performance impact.

As mentioned above, in some examples the store buffer comprises an equal number of entries of the first type and entries of the second type. Providing the same number of entries of the first and second type simplifies the logic for allocating entries to the store buffer and comparing the relative age of store buffer entries.

In some examples, circuitry configured to determine whether the second type of store buffer entry satisfies the forwarding condition returns a determination either at a later stage in a processing pipeline than circuitry configured to determine whether the first type of store buffer entry satisfies the forwarding condition, or at a later point within the same stage in the processing pipeline as the circuitry configured to determine whether the first type of store buffer entry satisfies the forwarding condition. This is because load operations for which the corresponding entry is the second type of store buffer entry are replayed speculatively (and are able to be flushed if it turns out that the forwarding condition is not satisfied for the youngest older entry than the load), and therefore a forwarding condition determination is not required in advance of making a decision whether to replay the load operation. Therefore, forwarding condition determination logic (and age comparison logic for determining the youngest older corresponding entry for which to evaluate the forwarding condition) for determining whether the youngest older second type of store buffer entry satisfies the forwarding condition does not need to satisfy as tight timing constraints as forwarding determination logic for the first type of store buffer entry, so that the demands of a larger number of store buffer entries and meeting a desired clock frequency can both be satisfied.

In addition to delaying processing of the load operation for entries of the second type which do satisfy the forwarding condition, in some examples the store buffer lookup circuitry is configured to delay processing of the load operation when the corresponding entry is the first type of store buffer entry and the corresponding entry fails to satisfy the forwarding condition. In this case, the forwarding condition is evaluated before replay of the load operation is signalled because the entry is a store buffer entry of the first type.

In some examples, the store buffer lookup circuitry is configured to replay the load operation replayed due to the corresponding entry being the first type of store buffer entry that fails to satisfy the forwarding condition.

In some examples, in response to the replayed load operation when the corresponding entry is the first type of store buffer entry, the store buffer lookup circuitry is configured to enable load data to be returned from the data store when an entry corresponding to the older store operation is no longer in the store buffer and there is no other entry corresponding to another store operation older than the replayed load operation, for which target addresses of the replayed load operation and the other older store operation satisfy an address comparison condition. In some examples, the store buffer lookup circuitry is configured to replay again the replayed load operation when an entry corresponding to the older store operation is still in the store buffer. In this case, it has previously been determined that an entry corresponding to the older store operation is not forwardable, and therefore if the entry is still in the store buffer it is likely that the entry will still not be forwardable.

FIG. 1 schematically illustrates an example of a data processing apparatus 2 which has processing circuitry 4 for performing data processing in response to instructions, a data store (e.g. memory system, which could include one or more caches and memory) 6 for storing data in response to a store operation issued by the processing circuitry 4, a store buffer 122, a load replay queue (LRQ) 124, a read-after-write (RAW) buffer 126, and a load prediction table (LPT) 128.

The processing circuitry 4 comprises a processing pipeline with a number of pipeline stages. Instructions progress down the pipeline and at each stage a certain part of the instructions' processing is carried out. In this example the pipeline 4 is an out-of-order pipeline which supports instructions being executed in a different order from the program order in which they are stored in the memory system 6.

The pipeline stages in this example include a fetch stage 100 for fetching instructions from the memory system 6, a decode stage 102 for decoding the fetched instructions to identify the operations to be performed and to generate control signals for controlling later pipeline stages to perform the corresponding operations, a register rename stage 104 for mapping architectural register specifiers specified by the instructions to physical registers 106 provided in hardware, and an issue stage 108 for retaining issued instructions or micro-operations in an issue queue until their required operands are available and selecting instructions for issuing for execution once the operands are available. As this is an out-of-order pipeline, the issue stage 108 supports the instructions being issued in a different order from the order in which they were fetched by the fetch stage 100, so that if an older instruction (which appears earlier in the program order) is stalled awaiting its operands then a younger instruction (which appears later in the program order) whose operands were already available can be issued ahead of the older instruction.

The pipeline 4 includes an execute stage 110 which includes a number of execution units for executing the processing operations corresponding to the issued instructions or micro-operations. The execute stage 110 includes a number of execution units of different types for executing different classes of instructions, such as an arithmetic/logic unit for executing arithmetic/logical instructions on integer operands, a floating-point execution unit for executing floating-point operations involving operands represented as floating-point numbers, as well as other types of execution unit for executing other types of processing operations, such as vector processing, branch operations etc. The execution units may also include a number of load pipelines, as well as one or more store pipelines for carrying out store operations to store data from the registers 106 to the memory system 6.

At least for some execute units, when the instructions are executed by a given execute unit, the execute unit generates a result which can be written back to registers 106 by a write back stage 112 of the pipeline. Speculative, out of order, updates to the physical register file could be performed by the write back stage 112, which can be rewound if speculation was incorrect (e.g. by using register renaming tables to track old versions of architectural state stored in the registers which can be restored if necessary by reverting to an old register renaming mapping). The write back stage may maintain a re-order buffer for tracking commitment of executed instructions based on their execution order and their program order, so that an instruction becomes committed once it has executed and any earlier instructions in the program order have also committed.

It will be appreciated that the processing system 2 could also have many other elements not shown in FIG. 1, such as a branch predictor or memory management unit. In this example the memory system 6 includes a level 1 instruction cache 114, a level 1 data cache 116, a shared level 2/further cache 118 and main memory 120, but it will be appreciated that other memory hierarchies could be used, for example with further levels of cache or a different sharing relationship between the instruction caches and the data caches.

The apparatus 2 also comprises a store buffer 122 and store buffer lookup circuitry 123. While the store buffer 122 and store buffer lookup circuitry 123 are shown separately to the processing circuitry 4, it will be appreciated that this particular arrangement of components is not limiting and the store buffer may be within the processing circuitry 4, such as within the issue circuitry 108 or within a load/store unit of the execute circuitry 110. The store buffer 122 is used to store data specified in a store operation in advance of the store operation completing to the data store 6. In some embodiments, although not shown, the store buffer may be separated across a number of buffers. For example, a store address buffer may be provided to store, among other things, information relating to a target address specified in a store operation and a store data buffer may be provided to store the data specified in the store operation. A "store buffer entry" may therefore refer to the combination of two or more corresponding entries across two or more store buffers.

Figure 2:
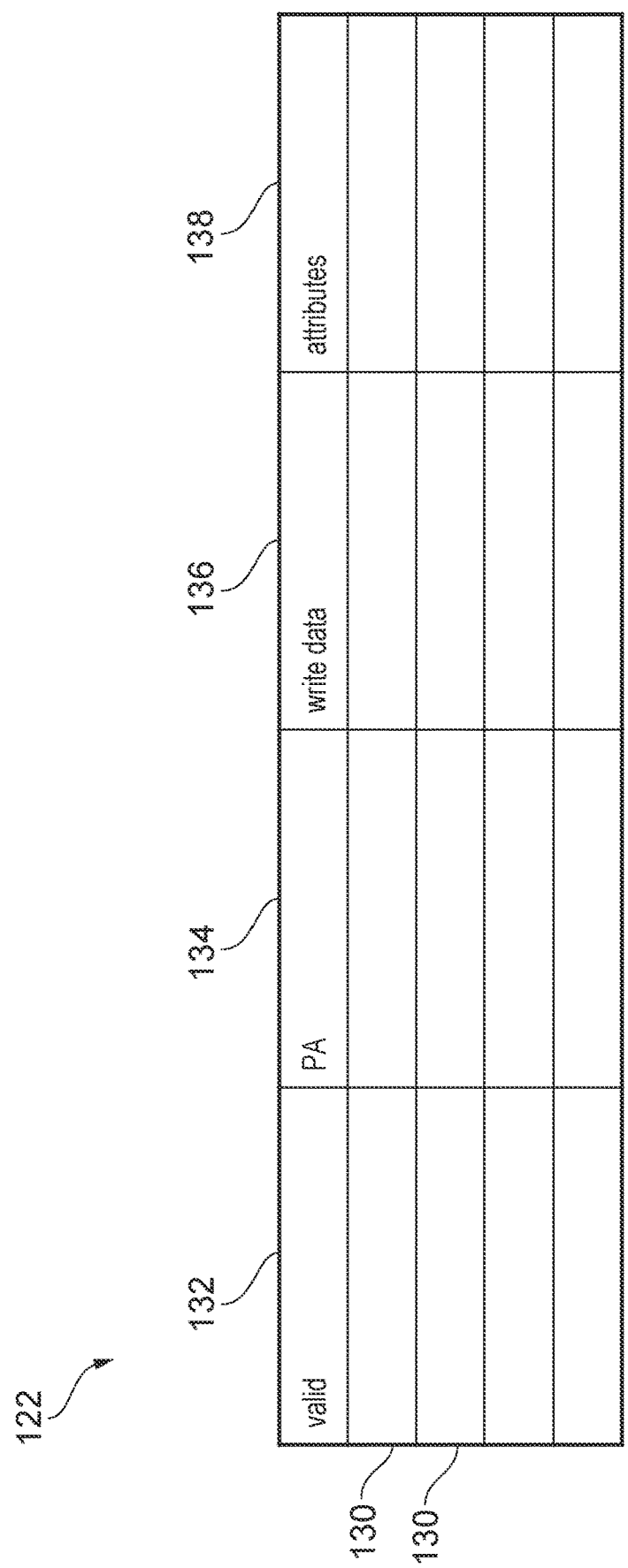
FIG. 2 schematically illustrates an example of a store buffer.

FIG. 2 schematically illustrates an example of a store buffer 122. The store buffer comprises a plurality of store buffer entries 130, each entry storing information corresponding to one store operation. Each store buffer entry 130 includes a valid field 132, a physical address field 134, a write data field 136, and an attributes field 138. The valid field 132 contains a valid bit indicating whether the store buffer entry 130 holds valid data, and can be used to determine which entries are free. The physical address field 134 contains information identifying a physical address of the location in the data store 6 at which the store operation is to store data. For example, the physical address field 134 could contain an entire physical address, a subset of physical address bits, or bits identifying a register storing the physical address, for example. The write data field 136 contains information identifying the information to be stored to the data store 6 in response to the store operation. For example, the write data field 136 could store the data to be written to the data store 6 itself, or could store a value identifying a register storing the data to be written to the data store 6. The attributes field 138 stores any further bits relating to the store operation, such as logical tags if the store is a checked store, bits describing the store type (atomic store etc.), and memory type bits. Although not shown, the store buffer may also contain a virtual address field storing a virtual target address associated with the store operation. As discussed above, although FIG. 2 shows these fields in the same store buffer structure, an alternative embodiment may provide two or more corresponding store buffers (such as an address store buffer and a data store buffer) and the fields may be split across the corresponding store buffers.

After a store operation has been issued and before the store operation has completed to the data store 6, the most up-to-date data for a given target address may be stored in the store buffer 122 as opposed to the data store 6. Therefore, in response to a load operation, store buffer lookup circuitry 123 looks up the store buffer 122 to determine whether the store buffer 122 contains an entry 130 corresponding to the load operation. An entry corresponds to the load operation if the target address of the store operation which caused the entry to be placed in the store buffer 122 and the target address of the load operation satisfy a comparison condition. The address comparison condition is satisfied if the region of the data store 6 to which the store operation is to store data overlaps with the region of the data store 6 from which the load operation is to load data. If the target addresses satisfy an address comparison condition, then the load operation cannot load data from the data store 6 because more up-to-date data is (or will be) stored in the store buffer 122 (the store may be waiting for the store data to be generated by an earlier instruction which can forward the store data to the store buffer after an entry has already been allocated for the store).

The store buffer lookup circuitry 123 is configured to perform store-to-load forwarding (STFL) in order to return a response to the load operation from the store buffer 122 without waiting for the older store operation to complete to the data store 6. In STLF, the youngest entry 130 in the store buffer 122 that is older than the load operation may be used to respond to the load operation if the entry satisfies a forwarding condition.

The forwarding condition may take a variety of forms, but for example may include an address alignment condition. If the target address of the load operation and the target address of the older store operation overlap and therefore satisfy the address comparison condition but are not identical, the forwarding condition may only be satisfied for certain offsets. In one example, the address alignment condition may require the address range targeted by one of the load or store operations to start or end at an address that is a predetermined fraction of the way through the address range targeted by the other of the load or store operations. For example, the address alignment condition may be satisfied if the region of memory targeted by the load operation begins at an address that is at a position halfway between the start and end of the region of memory targeted by the older store operation. It will be appreciated that the predetermined fraction is not limited and may be ¼, ½, or ¾, for example. The required level of overlap could alternatively be a multiple of a predetermined number of bits.

The forwarding condition may also, or alternatively, include an attribute condition. For example, page table attributes associated with a region of memory could define the region as a device type region mapped to an I/O (input/output) device for which it is required that each load operation targeting that region is actually issued to the memory region and for which STLF cannot be performed (for example, the I/O device may be a device for which the load or store operation is to trigger some physical action which needs to be performed in response to each separate load or store operation if requested multiple times—STLF cannot be performed for those load operations because it may cause the load operation to not reach the I/O device and therefore not trigger the physical action). STLF may also not be supported for non-cacheable memory locations, and/or in cases where STLF would break a consistency model for a memory location. Hence, the forwarding condition may be considered unsatisfied if the page table attributes for the accessed address are such that forwarding is not considered appropriate.

After the youngest older corresponding store buffer entry has been identified a forwarding vector may be calculated to enable the store buffer entry to be used to return a load response. The forwarding vector may be used to select data from the store buffer to be fed to the load result bus. In some examples the timing of the calculation of the forwarding vector is independent to the evaluation of the forwarding condition.

In some cases, the load operation may specify a target address which identifies a range of memory locations that partially overlaps with a store buffer entry, such that for the memory locations which correspond to the store buffer entry the data may be returned using the store buffer via STLF and for the memory locations which do not correspond to the store buffer entry the data may be returned from the data store. Hence, a load response may return data from both the data store and the store buffer.

In addition, a load response may be returned from more than one store buffer entry. For example, if the processing circuitry 4 issues an 8-byte load operation to load data from address X and there have been two older 4-byte store operations storing data to addresses X and X+4 which both correspond to different store buffer entries, the load may complete by performing STLF from both store buffer entries. For example, the store buffer lookup circuitry may consider the load operation to be comprised of two 4-byte loads for addresses X to X+3 and X+4 to X+7 which are handled separately.

By providing entries 130 in a store buffer 122, the processing circuitry 4 can issue a greater number of operations without waiting for earlier operations to complete. If there are no entries 130 available in the store buffer 122, the processing circuitry 4 may be unable to issue further operations until an entry 130 becomes available. Hence, it is preferable to provide more entries 130 in the store buffer 122 to reduce the likelihood of a pipeline stall.

As the number of store buffer entries 130 increases, several steps in the process of returning an STLF response may take an increased time to complete. Determining the youngest corresponding entry 130 in the store buffer 122 that is older than the load operation may increase in complexity as the number of store buffer entries 130 increases. This step identifies the entry for which the forwarding condition is to be evaluated. Also, once the youngest corresponding entry older than the load operation has been identified, a forwarding vector is calculated for the youngest corresponding store buffer entry older than the load operation. Therefore, the timing of the determination of the forwarding condition and calculation of the forwarding vector depend on the age determination logic, which takes longer to return a response as the number of store buffer entries increases (in a store buffer where entries are all treated equally). Hence, increasing the number of entries 130 in a store buffer would be expected to increase the time taken for a load operation response.

Therefore, the inventors have recognised that there is an undesirable trade-off between a number of entries in a store buffer 122 and the time taken for a response to a load operation.

FIG. 3 illustrates a segmented store buffer 122 according to the present technique. The segmented store buffer 122 comprises two types of entry, a first type of entry 140 and a second type of entry 142. Each type of entry 140, 142 comprises the same fields as the store buffer entry 130 of the store buffer 122 of FIG. 2. As with FIG. 2, although not shown the entries may provide a virtual address field. While in some examples the segmented store buffer is a single store buffer, the entries of the segmented store buffer may alternatively be stored across a number of corresponding entries of separate store buffers which are not particularly limited, such as a store buffer storing entries of the first type and a store buffer storing entries of the second type, or a store buffer storing data and a store buffer storing addresses and attributes, and so on. The store buffer entries of the first type 140 may be referred to as fast entries and the store buffer entries of the second type 142 may be referred to as slow entries. In the example of FIG. 3, each fast entry 140 corresponds to one slow entry 142. These are shown as entries occupying the same row of the segmented store buffer 122.

Figure 4:
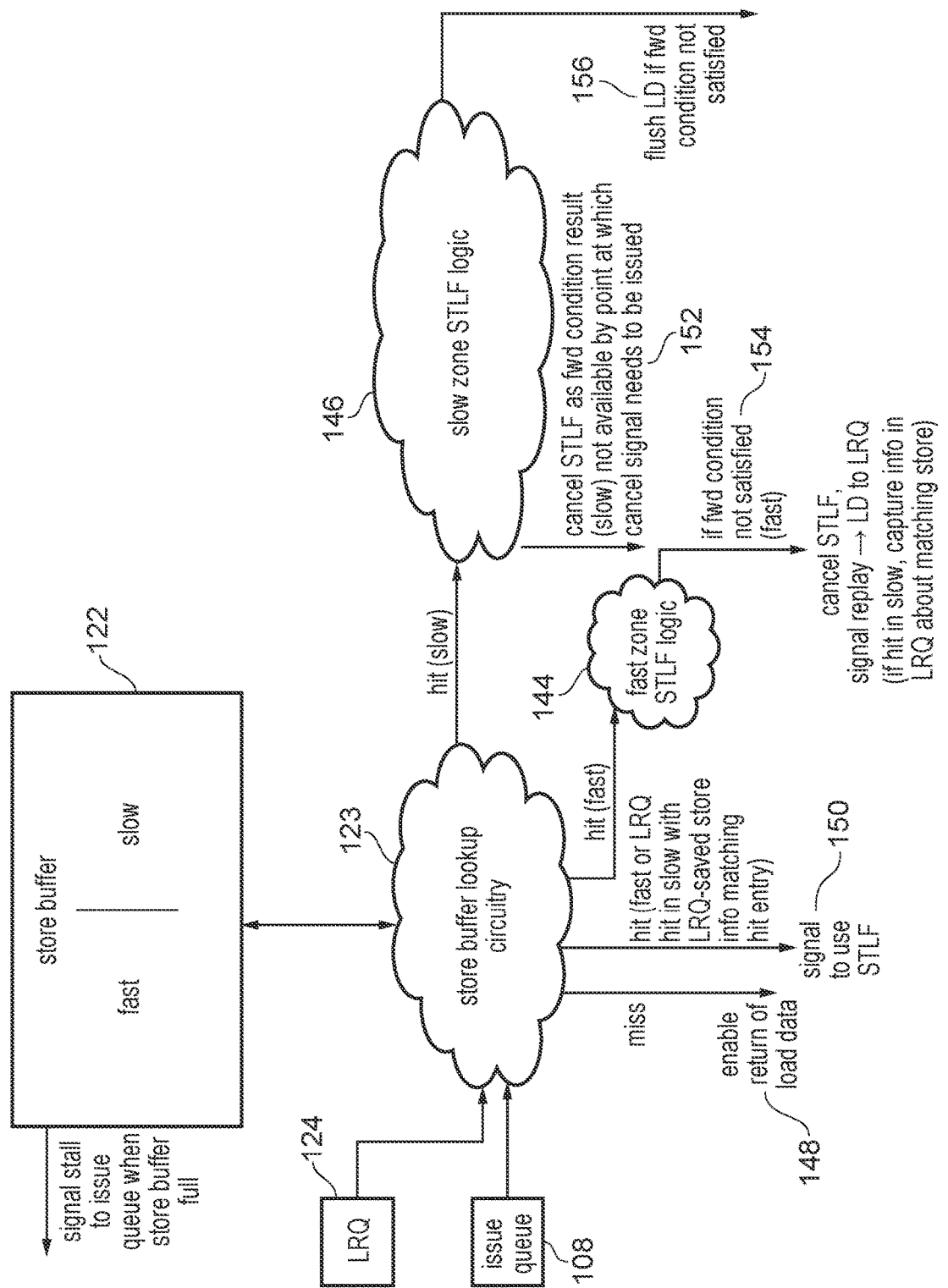
FIG. 4 illustrates operation of an apparatus comprising the segmented store buffer shown in FIG. 3.

FIG. 4 illustrates the operation of the apparatus comprising the segmented store buffer shown in FIG. 3. FIG. 4 shows the timing of various stages of the process, with timing flowing from left to right.

The process starts when the issue queue 108 issues a load operation to load data from a target address. In response to the load operation, store buffer lookup circuitry 123 looks up the segmented store buffer 122 to determine whether the store buffer 122 contains an entry 140, 142 corresponding to the load operation. As above, an entry 140, 142 corresponds to the load operation if the store operation which caused the entry to be allocated to the store buffer is directed to a target address which satisfies an address comparison condition with the target address of the load operation. The corresponding entry could be a fast entry 140 or a slow entry 142, or there could be several matching entries.

When the store buffer contains neither a fast entry 140 nor a slow entry 142 that satisfy the address comparison condition, then at stage 148 the store buffer lookup circuitry 123 signals that the lookup has missed, and that the store buffer 122 does not contain any data which is more up-to-date than the data stored in the data store 6. Therefore, a response to the load operation may be generated using information in the data store 6 (although see discussion below regarding comparisons based on VAs and PAs). The data store response may have been speculatively started before the store buffer lookup circuitry 123 determined that the store buffer lookup missed, and therefore no action may need to be taken to enable the return of data from the data store 6.

When the store buffer is found to contain a corresponding entry, then at stage 150 the store buffer lookup circuitry signals to speculatively begin STLF. However, STLF cannot complete unless it is known which entry is the youngest corresponding entry, it has been determined whether that entry satisfies the forwarding condition, and the forwarding vector has been calculated.

When there is at least one corresponding fast entry 140 and there are no corresponding slow entries, fast zone STLF logic 144 (comprising age determination logic, forwarding condition evaluation logic, and forwarding vector calculation logic) determines whether STLF can be performed and calculates a forwarding vector for returning a load response. The age determination logic determines which fast entry is the youngest corresponding entry that corresponds to a store operation older than the load operation. Then, the forwarding condition determination logic 144 determines whether the youngest older corresponding entry satisfies the forwarding condition while the load operation is pending. After the youngest corresponding entry older than the load operation has been identified, and independently from the evaluation of the forwarding condition, the forwarding vector calculation logic calculates a forwarding vector to enable the store buffer entry to be used to return a load response. If the forwarding condition is not satisfied, then at stage 154 STLF is cancelled and the load operation is signalled to be replayed. The load operation is allocated to the load replay queue (LRQ) 124 for replay. The LRQ 124 may be a dedicated structure for handling STLF using the techniques described herein, but may alternatively be a structure that is also used for other replayed load operations, such as those replayed due to losing cache arbitration.

When there is at least one corresponding entry that is a slow entry 142 on the first pass, then at stage 152 STLF is cancelled and the store buffer lookup circuitry 123 signals that the load operation is to be replayed. Information identifying the load operation and the corresponding entry is then placed in the LRQ 124 at stage 154. The STLF is cancelled (even though it is not yet known whether the forwarding condition will or will not be satisfied) because for slow entries, the youngest older entry, the forwarding condition and the forwarding vector are evaluated off the critical path. The STLF logic for slow entries 146 (also comprising age determination logic, forwarding condition evaluation logic and forwarding vector calculating logic) is unable to return a forwarding condition determination in time to cancel STLF if the forwarding condition is not satisfied. By cancelling the load operation, the same STLF timing can be used for both fast and slow entries without having to slow down the cancel logic to wait for a forwarding condition determination for slow entries, which would impact response times for fast entries. This allows the STLF logic for slow entries 146 to be slower than the STLF logic for fast entries 144 without impacting STLF performance. Therefore, the STLF logic for returning a load response for fast entries 144, which needs to meet circuit timing requirements and hence limits the fastest clock frequency is not impacted by the addition of slow entries 142.

Following the cancellation of STLF at stage 152, slow zone age determination logic determines which corresponding slow zone entry is the youngest, and the forwarding condition is evaluated for the youngest corresponding entry. If the forwarding condition is found to be satisfied, then the load may proceed to be replayed for a second pass. The replay has already been signalled at stage 152, and as the forwarding condition is satisfied there is no need to cancel this replay. Independently of the evaluation of the forwarding condition, a forwarding vector is calculated for the youngest corresponding entry older than the load operation, which has been identified by the age determination logic, and the forwarding vector is stored in the LRQ 124. In one example, the forwarding vector comprises the non-wrap bits of a STID of the corresponding entry, which allow the corresponding entry to be indexed, and hence enable data to be returned from the store buffer in a load response by indexing into the corresponding entry. If the forwarding condition is found to be not satisfied, the processing pipeline is flushed of the load operation and any younger operations at stage 156. Hence, load operations hitting against a slow entry 142 are only replayed if the forwarding condition is found to be satisfied for that entry.

After being allocated to the LRQ 124, the load operation that hit on a slow entry 142 on the first pass is replayed. The store buffer lookup circuitry can determine that the load has been replayed due to previously hitting on a slow entry that satisfied the forwarding condition based on the state of an indicator (such as a 1-bit flag) set in the LRQ. On the second pass, the store buffer lookup circuitry 123 again looks up the store buffer 122 for entries satisfying an address comparison condition. At this point, stages 148, 150, and 144 may take place as before if the store buffer lookup results in a miss or a hit on only a fast entry 140.

If any corresponding entry on replay is a slow entry 142, then as the load operation is a load operation replayed due to the corresponding entry being a slow entry that satisfied the forwarding condition, the blind cancel that occurred on the first pass (at stage 152) is suppressed for the second pass. Slow zone age determination logic determines the youngest corresponding store buffer entry of the second type, and the STID of the youngest older corresponding entry on replay is compared to the stored STID of the corresponding entry on the first pass, stored in the LRQ 124.

If the corresponding entry on replay is a slow entry 142 that does not correspond to the same older store operation as the corresponding entry on the first pass (if the STIDs do not match—this may be the case if entries have been added to the store buffer between the first and second pass), then it is not known whether the corresponding-on-replay entry satisfies the forwarding condition and the forwarding vector stored on the first pass cannot be used for this entry. At this point, the replayed load operation may be replayed again and the forwarding condition and forwarding vector may be re-evaluated for the new corresponding entry after the replayed load operation has been allocated to the LRQ.

However, if the corresponding-on-replay entry does correspond to the same older store operation as the slow entry 142 that caused the load operation to be replayed on the first pass (at stage 152) (if the STIDs match), then the forwarding condition has already been evaluated for the corresponding-on-replay entry at stage 146 on the first pass. Hence, at this point it is known that the youngest entry older than the load operation satisfies the forwarding condition and may be used for STLF. Further, the forwarding vector has already been calculated for this entry and has been stored in the LRQ 124. Therefore, the speculative STLF started at stage 150 is not cancelled, and STLF is then carried out using the forwarding vector stored in the LRQ for the corresponding entry. It will be seen that the reason that replayed load operations are flushed for entries that fail to satisfy the forwarding condition is because the act of replaying a load operation implies that the forwarding condition is satisfied. If replay of a load operation that failed to satisfy the forwarding condition were allowed, then on the next pass the corresponding entry may be incorrectly used for STLF even though it fails to satisfy the forwarding condition.

Hence, the segmented store buffer 122 shown in FIG. 3 enables additional entries to be added to a store buffer 122 without affecting the load response time for fast entries 140. The store buffer shown in FIG. 2 may be considered to comprise entirely fast entries. By applying the technique of FIG. 3, the capacity of a store buffer can be increased by adding slow entries without having to sacrifice load response time for existing fast entries, as the STLF logic for fast entries is not slowed down to account for the slower forwarding condition determination logic and forwarding vector calculation logic for slow entries. Rather, the logic (age determination, forwarding condition evaluation, and forwarding vector calculation) for the slow entries is moved off the critical path, allowing the STLF logic to keep to the same clock frequency as for the fast entries.

On the first pass, the age determination, forwarding condition evaluation, and forwarding vector calculation for a hit on a slow zone entry all occur off the critical path after replay of the load operation has been signalled. This compares to the case where the slow zone logic is constrained to return a forwarding condition response before signalling replay, in which case the replay timing (and hence clock frequency) would be slowed down to give enough time for a response to be returned. However, by moving these steps off the critical path (by blindly cancelling and replaying load operations hitting on slow entries) the clock frequency is not slowed down to allow them to complete, and the clock frequency can be made commensurate with the number of fast zone entries (for which a response is returned in time to signal replay).

On the second pass, the slow zone age determination logic may be on the critical path to enable the youngest older corresponding slow zone entry to be determined to enable a comparison of STIDs between the youngest older corresponding entry and the stored STID. However, the forwarding condition determination and forwarding vector calculation remain off the critical path having been performed prior to the reissuing of the replayed load operation, so that the confirmation of whether the youngest older corresponding entry matches the previously stored STID can be returned in time to be able to carry out STLF on the second pass.

As discussed above, the store buffer lookup circuitry 123 determines which corresponding entry is the youngest entry older than the load operation. As such, the store buffer lookup circuitry 123 needs to be able to compare the relative age of store and load operations. This is achieved through the use of store buffer identifiers (STIDs).

Store operations are allocated an STID obtained by incrementing the STID allocated to the previous store operation. For example, a counter can be maintained at the issue stage or elsewhere in the processing circuitry 4, which is incremented in response to each store operation. A load operation is allocated an STID equal to the STID to be allocated to the next store operation that is younger than the load operation. Therefore, in general a given store operation is older than another store operation which has a higher STID value and younger than another store operation which has a lower STID value. In addition, a load operation is younger than a store operation having a lower STID and older than a store operation having the same or a higher STID. It will be appreciated that the same effect could be achieved by assigning STIDs in a decrementing order and inverting the age comparisons discussed above.

Figure 5:
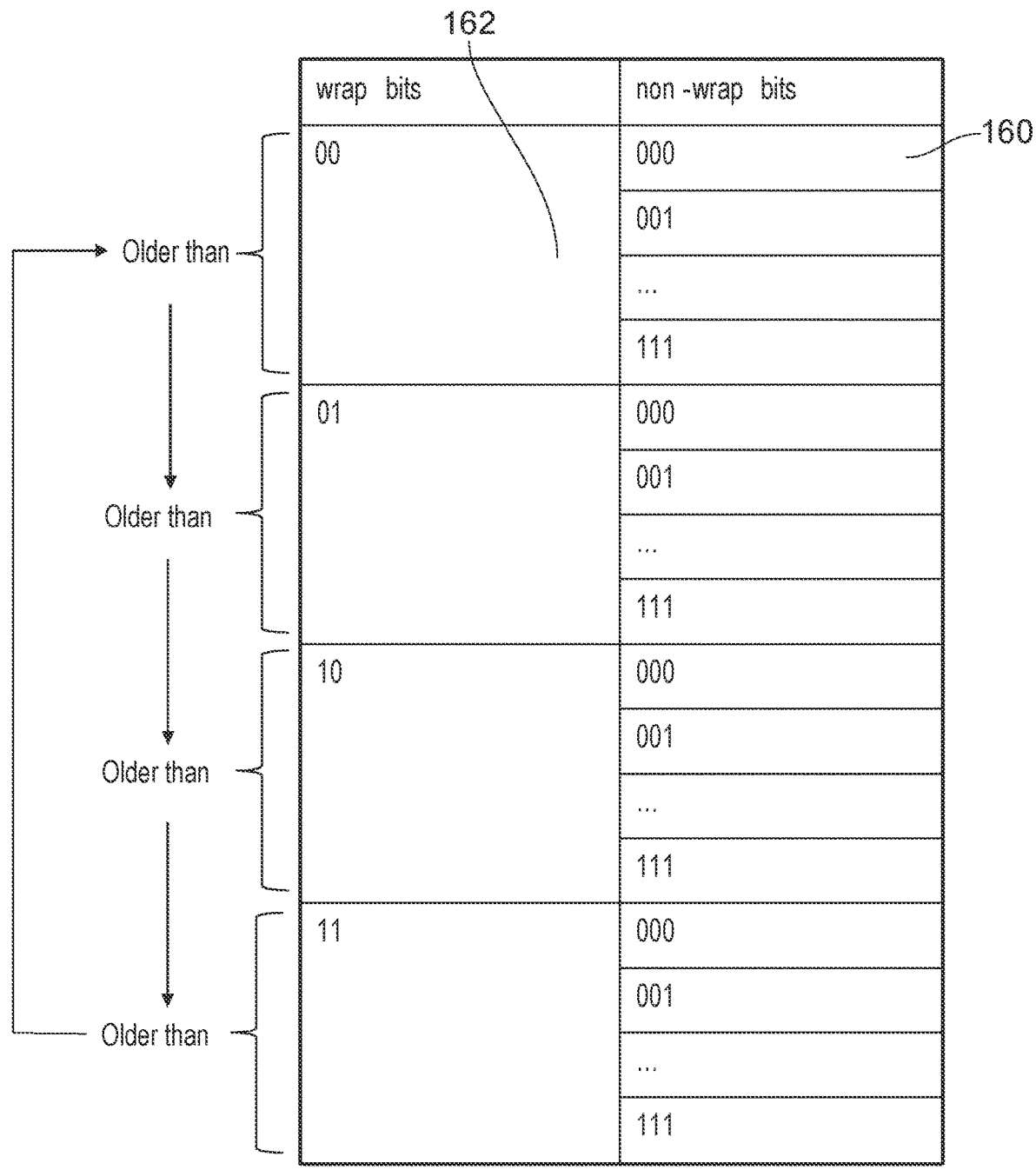
FIG. 5 illustrates a relationship between wrap bits and non-wrap bits of a store buffer identifier.

STIDs comprise two sets of bits, wrap bits and non-wrap bits. FIG. 5 illustrates the relationship between wrap bits 162 and non-wrap bits 160. Together the wrap bits 162 and non-wrap bits 160 make up the STID, with the wrap bits 162 in the most significant bit positions and the non-wrap bits 160 in the least significant bit positions. Therefore (for now not considering the case where wrap bits 162 overflow, discussed below) in general any STID having a higher value of wrap bits 162 than another STID has a higher value of the STID overall without needing to consider the non-wrap bits 160.

In the store buffer according to the present technique, entries are indexed using the non-wrap bits 160 as shown in FIG. 3. Non-wrap bits 160 are not stored explicitly but can be inferred from the position of the entry in the store buffer 122. Fast and slow entries may share the same non-wrap bits 160.

Entries are allocated to and deallocated from the store buffer 122 in order. In addition, entries are allocated to the fast entries with priority over the slow entries. Therefore, until the fast entries are filled, the age of two entries can be compared by comparing the index of the two entries (the non-wrap bits 160) as follows:

| index (implicit) | fast | slow |
|---|---|---|
| 000 | A | |
| 001 | B | |
| 010 | C | |
| 011 | D | |
| 100 | | |

In this example, the age of entries is displayed by allocating entries in alphabetical order. It will be seen that entry "C" is newer than entry "A" and older than entry "D", which can be entirely determined by comparing the non-wrap bits 160 of the STID.

However, when the fast entries become filled, age determination cannot be entirely carried out using the index of the entry:

| index (implicit) | fast | slow |
|---|---|---|
| 000 | A (00) | F (01) |
| 001 | B (00) | G (01) |
| 010 | C (00) | H (01) |
| 011 | D (00) | |
| 100 | E (00) | |

As shown above, entry "C" is older than entry "G" but has a larger value of the non-wrap bits 160. Hence, age cannot be determined entirely based on non-wrap bits 160, and wrap bits 162 are used. The slow entries are allocated to the store buffer with a wrap bit incremented from the wrap bit of the youngest fast entry 140.

Therefore, if entries A-E have wrap bits 162 "00", entries F-H have wrap bits 162 "01".

As entries are deallocated from the store buffer, the slow entries are transferred to the corresponding fast entry 140. The STIDs are not changed when an entry is moved from a slow entry 142 to a fast entry 140 (this is possible because there is a one-to-one mapping between slow entries 142 and fast entries 140 and so the corresponding slow/fast entries 140, 142 share the (non-wrap bits) for the STIDs and the wrap bits are implicit so do not require any update). Therefore, there may be fast entries having different wrap bits 162. Therefore, in order to determine the wrap bits 162 from the store buffer 122, a deallocation pointer is provided indicating the oldest entry in the store buffer (or otherwise allowing the oldest entry to be identified—e.g. the pointer could actually point to the entry just before the oldest entry, which is the most recently deallocated entry). For fast entries with non-wrap bits 160 greater than or equal to the deallocation pointer, the wrap bits 162 are the same as those of the oldest entry. For fast entries with non-wrap bits 160 less than the deallocation pointer, i.e. entries preceding the deallocation pointer, the wrap bits 162 are incremented with respect to the oldest entry. This is the same for slow entries but with the wrap bits 162 also incremented by 1. This is shown below, with the wrap bits 162 indicated:

| index (implicit) | fast | slow |
|---|---|---|
| 000 | F (01) | K (10) |
| 001 | G (01) | |
| 010 (deallocation pointer) | C (00) | H (01) |
| 011 | D (00) | I (01) |
| 100 | E (00) | J (01) |

Therefore, wrap bits 162 may be inferred from the location of the deallocation pointer and whether the entry is a fast entry 140 or a slow entry 142. To infer an absolute value of the wrap bits 162 as opposed to a relative value, wrap bits 162 corresponding to the deallocation pointer are stored. For example, entry G is in the second row and therefore has non-wrap bits equal to "001". Entry G is behind the deallocation pointer in a fast entry 140, so has wrap bits 162 equal to the deallocation pointer incremented by 1. The deallocation pointer entry has wrap bits 162 "00" so G has wrap bits 162 "01", and therefore has the STID "01001". It will be appreciated that many variations on this scheme are possible. The number of wrap bits and non-wrap bits is not limited, and may be associated with the number of store buffer entries provided. Also, where incrementing wrap bits by "1" has been described, it will be appreciated that wrap bits could be incremented or decremented by any predetermined value. Entries can be compared as follows:

Is the store operation corresponding to entry D younger or older than the store operation corresponding to entry G?
Entry D is a fast entry 140 ahead of the deallocation pointer.
Entry G is a fast entry 140 behind the deallocation pointer.
Entry G has wrap bits 162 incremented compared to entry D. There is therefore no need to compare non-wrap bits 160—entry D is older.

Is the store operation corresponding to entry I younger or older than the store operation corresponding to entry F?
Entry I is a slow entry 142.
Entry F is a fast entry 140.
Fast entries are always older than young entries—entry F is older.

Is the store operation corresponding to entry D younger or older than the store operation corresponding to entry E?
Entry D is a fast entry 140 ahead of the deallocation pointer.
Entry E is a fast entry 140 ahead of the deallocation pointer.
Therefore the older entry can be determined by comparing the non-wrap bits (or the index values of the entries). The comparison may be implicit in some cases, for example the store buffer could be searched backwards starting from the deallocation pointer (e.g. hitting entries in the order G, F, E, D etc.) and the order in which entries are hit could imply their relative age (the first entry to be hit would be the youngest and so on), which would be an implicit comparison based on the index values of the entries. In this case the non-wrap bits 160 for entry E are higher than for entry D—entry D is older.

As mentioned previously, wrap bits 162 may overflow. For example, there may be two-bits encoding the wrap bits 162 as shown in FIG. 5 (although the example is not so limited, and the wrap bits may comprise any number of bits). At any one time, there may be three different wrap values in use so two bits is sufficient to represent the range of wrap values while leaving one wrap value free. When the newest store buffer entry is associated with wrap bits of "11", and the next store buffer allocation requires the wrap bits 162 to be incremented, the next wrap bits 162 to be allocated are "00". The store buffer will therefore have entries with wrap bits 162 "00", "10" and "11", and it can be inferred from the lack of "01" STIDs that the "00" STIDs are due to an overflow of wrap bits 162 and are therefore newer than STIDs with wrap bits of "10" or "11". This is illustrated in FIG. 5. As mentioned, although FIG. 5 shows an incrementing counter to allocate STIDs, other implementations could equally use a decrementing counter. There may also be many other ways of tracking in the store buffer which entries are older or younger besides the use of wrap and non-wrap bits, for example by explicitly storing STIDs themselves in each entry.

Figure 6:
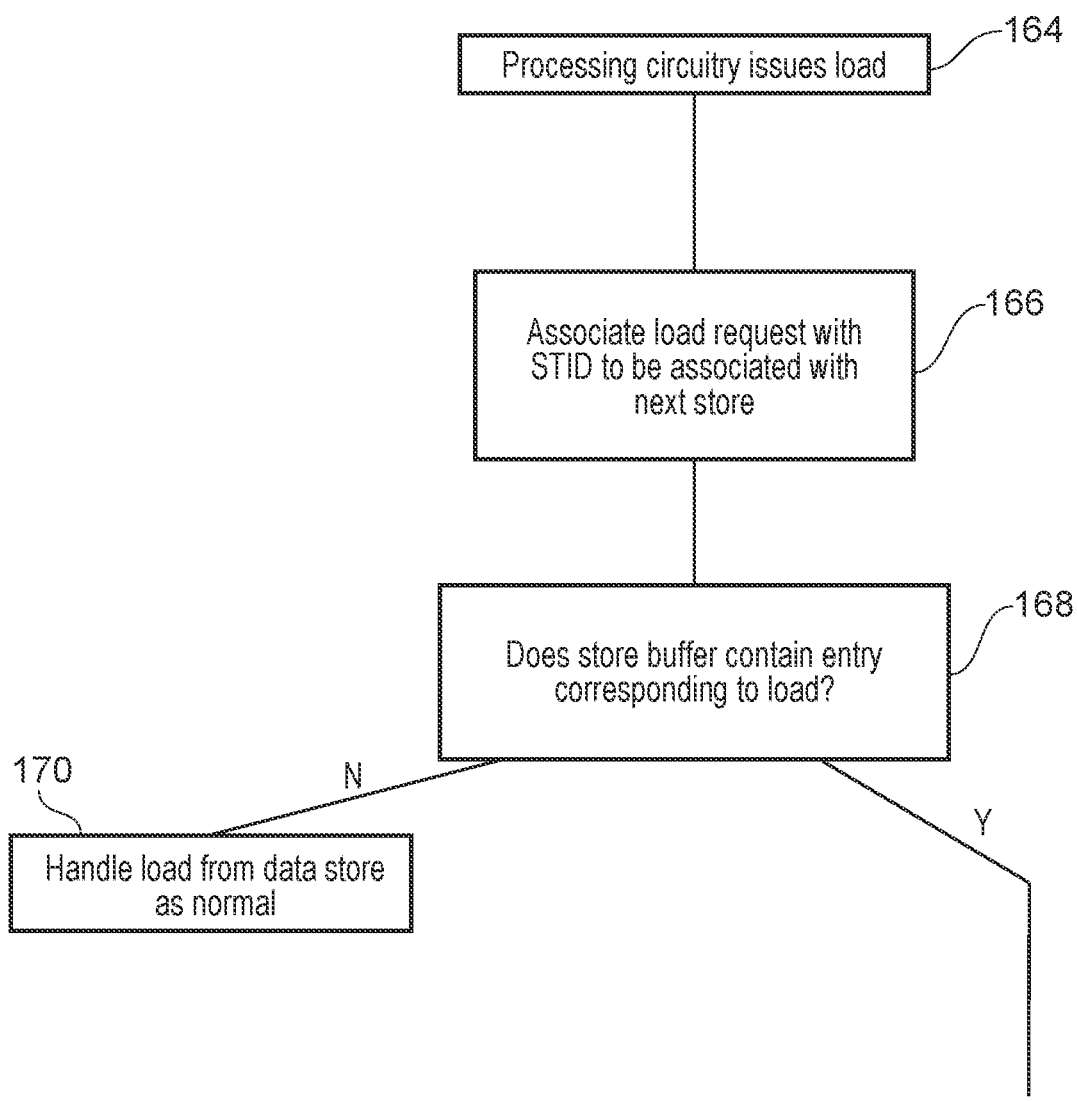
FIG. 6 illustrates a process of using the segmented store buffer of FIG. 3 in response to a load operation.
Figure 6:
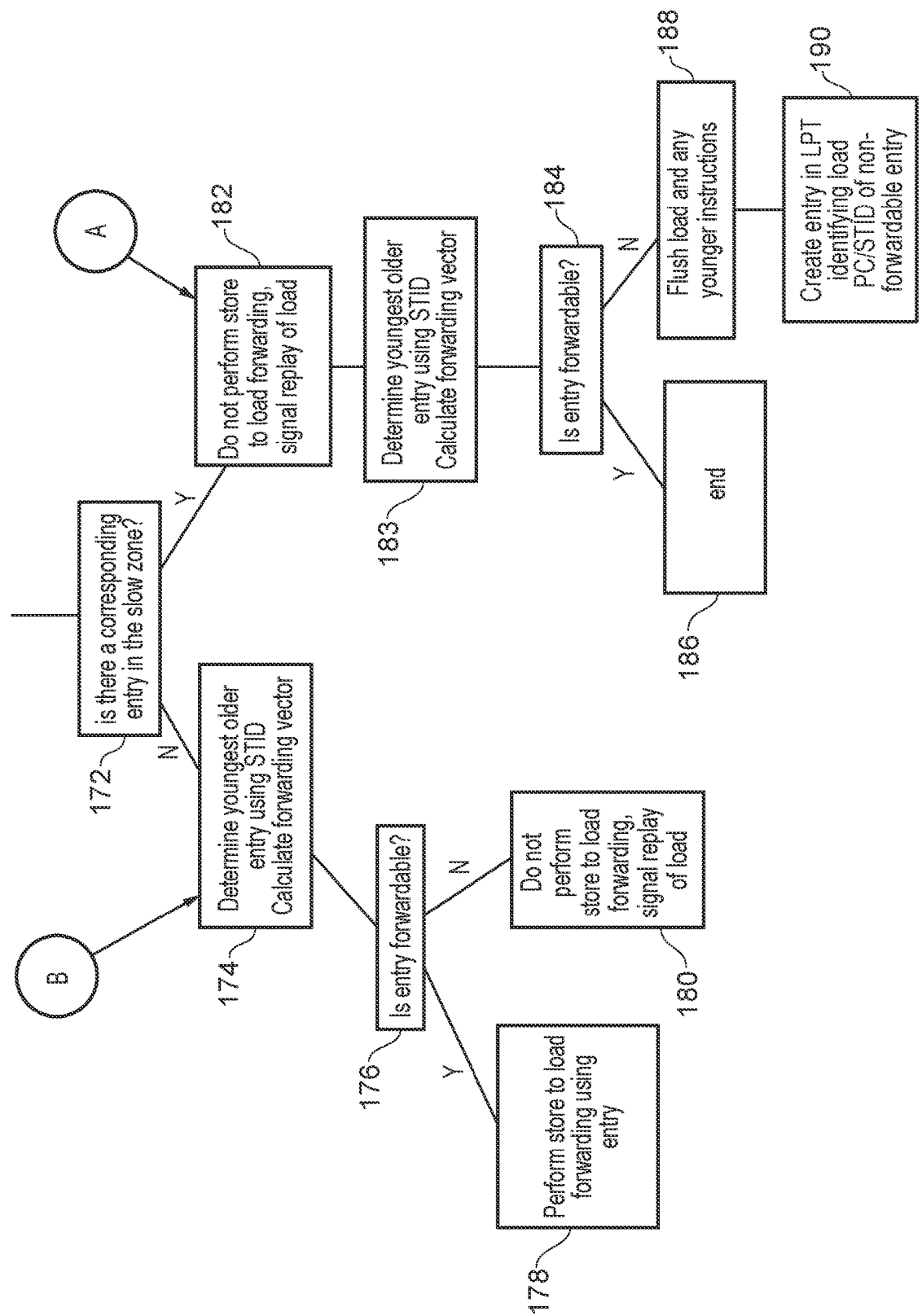

FIG. 6 illustrates a process of using the segmented store buffer 122 in response to a load operation according to the present technique.

At step 164, issue circuitry 108 in the processing circuitry 4 issues a load operation to read data from a target address in a data store 6. The target address may be specified as a virtual address (VA) or a physical address (PA).

At step 166, the load operation is associated with the store identifier (STID) which will be associated with the next store operation younger than the load in program order. Determining the STID of the next store operation may be performed based on a STID counter used by the issue stage 108 to track allocation of STIDs.

At step 168, store buffer lookup circuitry 123 determines whether the store buffer 122 contains an entry for an older store operation that corresponds to the target address of the load operation. The lookup includes all valid slow entries 142 and all valid fast entries 140 that are older than the load operation. Whether an entry is older than the load operation can be determined by comparing the STID of the load operation to the STID of the entry. The age determination could alternatively be performed implicitly by inferring the relative age of entries based on their position in the store buffer, without requiring a direct comparison of STIDs. The determination is carried out for each given store buffer entry by evaluating an address comparison condition between the target address of the load operation and the target address of the store operation which caused the given store buffer entry to be allocated. If the regions of the data store 6 addressed by the two target addresses overlap, the address comparison condition is satisfied (below, the term "match" is used to refer to the address comparison condition being satisfied). The address comparison condition may be performed using the target VAs or target PAs. For example, the comparison may be performed based on the PAs if available, but based on the VAs otherwise. The lookup may be performed for the slow zone entries before being performed for the fast zone entries, and if a match is found in the slow zone then no match may be needed in the fast zone as the slow zone entries are younger than the fast entries. The lookup within each zone of the store buffer may be a non-sequential lookup to determine whether there are any matching entries within that zone without comparing their relative age.

If the store buffer 122 does not contain any corresponding entries, the load operation may read data from the data store 6, as there is no newer data in the store buffer 122. Hence, at step 170 the load operation is handled from the data store 6 in the same way as if the store buffer 122 were not provided. In order to determine that the load does not target the same physical address as a pending store when the address comparison is performed using VAs, then in addition to the address comparison condition between the load operation and all valid store buffer entries failing on the basis of the VA comparison, an extra check may be performed to determine whether any of the entries satisfy the address comparison condition based on the PAs of the load and the corresponding store. If no matching entries were found in the VA comparison, but a matching entry is found in the PA comparison, a load operation cannot be returned using the data store 6, and in that case the load is replayed. Even though the PAs match, as the VAs mismatched and STLF may be controlled based on VA comparison to make critical path timing shorter, it may be too late to trigger STLF by the time the PA match is detected and so despite the load and store corresponding to the same physical location in memory, STLF may not be possible—instead the load may wait until the corresponding store with the matching PA is completed before being able to proceed to return data from the cache.

Other implementations may perform the initial address comparison at step 168 based on PAs, and in that case if no PA match is detected, the load can be handled from the data store at step 170 without needing any further check of VA or PA matching.

However, if the store buffer 122 does contain a corresponding entry, then data in at least one data store location addressed by the target address of the load operation is out-of-date, with more up-to-date data being stored in the store buffer 122. This does not mean that the entire data store region targeted by the load operation is out-of-date if there is an offset between the load and store target addresses. However, in any case, the load operation cannot use the data store 6 to return a complete load response. Therefore, if a speculative load response has begun at the data store 6, this may be cancelled. It is then determined whether the load operation can use the store buffer 6 to generate a load response via store-to-load forwarding (STLF).

At step 172, it is determined whether there are any corresponding entries in the slow zone.

If there are no entries in the slow zone, then at step 174 age determination logic determines which corresponding fast zone entry is the youngest entry older than the load operation, and forwarding vector calculation logic calculates a forwarding vector for the entry. Then at step 176 (which in some examples may be performed simultaneously with the calculation of the forwarding vector) the forwarding condition determination logic 144 determines whether the youngest older entry satisfies the forwarding condition. If the forwarding condition is satisfied, the entry is used to respond to the load operation at step 178. For example, if the store buffer 122 stores data in the store buffer entries, at least a subset of data stored in the fast entry 140 satisfying the forwarding condition is returned to the processing circuitry 4 in a load response. This is store-to-load forwarding (STLF). If the forwarding condition is not satisfied, the store buffer entry cannot be used to respond to the load operation and any speculative STLF is cancelled (step 180). The store buffer lookup circuitry 123 signals that the load operation is to be replayed and it is then allocated to a load replay queue (LRQ) 124.

If there is a corresponding entry which is a slow entry 142, then the forwarding condition evaluation (which depends on first determining the youngest older entry) may not be completed in time to cancel any speculative STLF if the forwarding condition is not satisfied, and therefore speculative STLF is cancelled at step 182 (without waiting for the forwarding condition to be determined). The store buffer lookup circuitry signals that the load is to be replayed (even though replay could be wrong if the forwarding condition turns out to be not satisfied). Information identifying the load operation and the corresponding entry are then stored in the LRQ 124. For example, the STID of the corresponding entry may be stored in the LRQ 124. A 1-bit flag (or other identifier) corresponding to the load operation is set in the LRQ 124 to indicate that the load operation has been added to the LRQ 124 due to the corresponding store buffer entry being the second type of store buffer entry that satisfies the forwarding condition.

Although the forwarding condition could not be evaluated in time to perform STLF on the first pass, the slow entry 142 may nevertheless satisfy the forwarding condition and be available for STLF. Hence, after STLF has been cancelled at step 182, at step 183 the age determination logic determines the youngest matching entry that corresponds to a store operation older than the load operation. Also at step 183, a forwarding vector is calculated for the youngest corresponding entry older than the load operation to enable data to be selected from the store buffer to be fed to the load result bus in order to enable STLF on replay. In some examples, the forwarding vector is derived from the non-wrap bits of the STID identifying the entry. The non-wrap bits of the STID describe the location of the corresponding entry within the store buffer, and therefore may be used to retrieve data from the corresponding entry in the store buffer for generating a load response. At step 184 forwarding condition determination logic determines whether the corresponding entry satisfies the forwarding condition. Load operations that correspond to an entry satisfying the forwarding condition are replayed, as these are the load operations which are eligible for STLF on replay.

If it is determined that the corresponding entry satisfies the forwarding condition, then at stage 186 the speculatively signalled replay (signalled at step 182) does not need to be cancelled.

If, however, it is determined that the corresponding entry fails to satisfy the forwarding condition, then as only load operations corresponding to entries satisfying the forwarding condition are replayed, the load operation is prevented from being replayed. This is achieved at step 188 by flushing the load and any younger instructions from the processing pipeline.

Following the pipeline flush, it is likely that the flushed load operation will be reissued. If this operation is allowed to proceed as usual, then it is likely that it will correspond to the same store buffer entry as before and therefore lead to another pipeline flush on replay. Flushing the pipeline significantly impacts performance, so it is desirable to avoid repeating the pipeline flush. Therefore, at step 190, an entry is created in the load prediction table (LPT) to cause the reissued load operation to be stalled until it is less likely that issuing the load operation will lead to a pipeline flush. For example, the load can be stalled until the corresponding entry that failed to satisfy the forwarding condition is no longer a slow entry 142.

Figure 7:
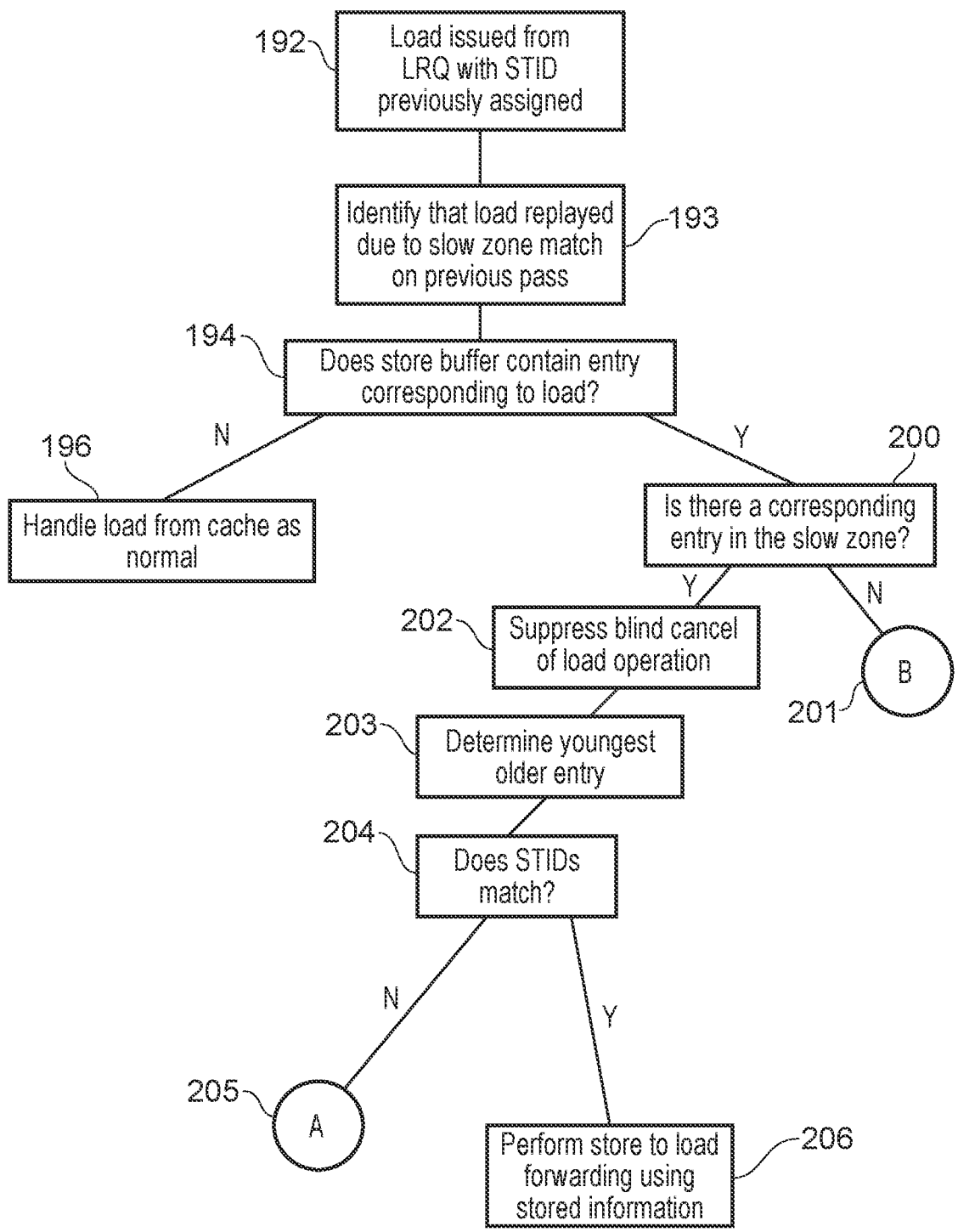
FIG. 7 illustrates a process of using the segmented store buffer of FIG. 3 in response to a replayed load operation.

FIG. 7 illustrates a process of using the segmented store buffer in response to a replayed load operation according to the present technique.

At step 192 a load operation indicated in the LRQ 124 is replayed. At step 193 it is determined from the 1-bit flag (or identifier) set in the LRQ 124 at step 182 that the load was replayed due to the corresponding entry being a second type of entry that satisfied the forwarding condition. The load operation is issued with the same STID that was allocated to the load operation when it was first issued on its first pass, because the replayed load operation corresponds to the same point in the logical sequence of instructions as the initial load operation, and STIDs are used to determine the relative position of load/store operations in the logical (program order) sequence of instructions.

At step 194 it is determined whether the store buffer 122 contains an entry corresponding to the replayed load operation (a corresponding-on-replay entry) in the same way as at step 168 of FIG. 6. If there is no corresponding-on-replay entry then the load may be handled from the cache at step 196.

However, if it is determined that there is a corresponding entry, then at step 200 it is determined whether there is a corresponding entry in the slow zone. If not, then the youngest corresponding entry is in the fast zone and at step 201 STLF is handled according to steps 174, 176, 178, and 180 of FIG. 6.

However, if at step 200 it is determined that a corresponding-on-replay entry is a slow entry 142 then because the load has been replayed due to the corresponding entry being a second type of entry that satisfied the forwarding condition (which was determined at step 193), then at step 202 the load cancelling of step 182 is suppressed. At step 203 age comparison logic determines which slow zone entry is the youngest matching entry corresponding to a store operation older than the load operation.

At step 204 the STID stored in the LRQ 124 entry from which the load was reissued at step 192 is compared to the STID of the youngest corresponding-on-replay entry. If the STIDs match, then the youngest corresponding-on-replay entry older than the load operation corresponds to the same store operation as the entry that caused the load to be replayed and it is therefore known that the forwarding condition is satisfied and the forwarding vector has previously been calculated and stored in the LRQ 124. Therefore at step 206 the previously computed forwarding vector is used to perform STLF from the corresponding-on-replay entry in response to the replayed load operation.

If the STIDs do not match then the slow entry does not correspond to the same store operation as the entry that caused the load operation to be replayed and the forwarding condition and forwarding vector for the corresponding slow entry are evaluated off the critical path, so the process proceeds to step 205, at which point the steps of FIG. 6 are performed from step 182 onwards.

Hence, if the initial load matched a slow entry 142 (step 182) which satisfied the forwarding condition (step 186), the corresponding-on-replay entry is either:

the same slow entry 142 corresponding to the same store operation as on the initial pass, in which case the forwarding condition is known to be satisfied, the forwarding vector has already been calculated, and STLF can be carried out in response to the replayed load operation (step 206).

a different entry to the corresponding entry on the initial pass due to either a new entry being added to the store buffer or the previous entry being migrated to the fast zone, where the different entry may be:

a fast entry 140, in which case the forwarding condition is to be evaluated and STLF may be carried out in response to the replayed load operation (step 201), or a slow entry 142 corresponding to a different store operation (which will be a new younger store relative to the store seen on the previous pass), in which case the load is to be replayed again because the forwarding condition cannot be evaluated in time to perform STLF (step 205).

Figure 8:
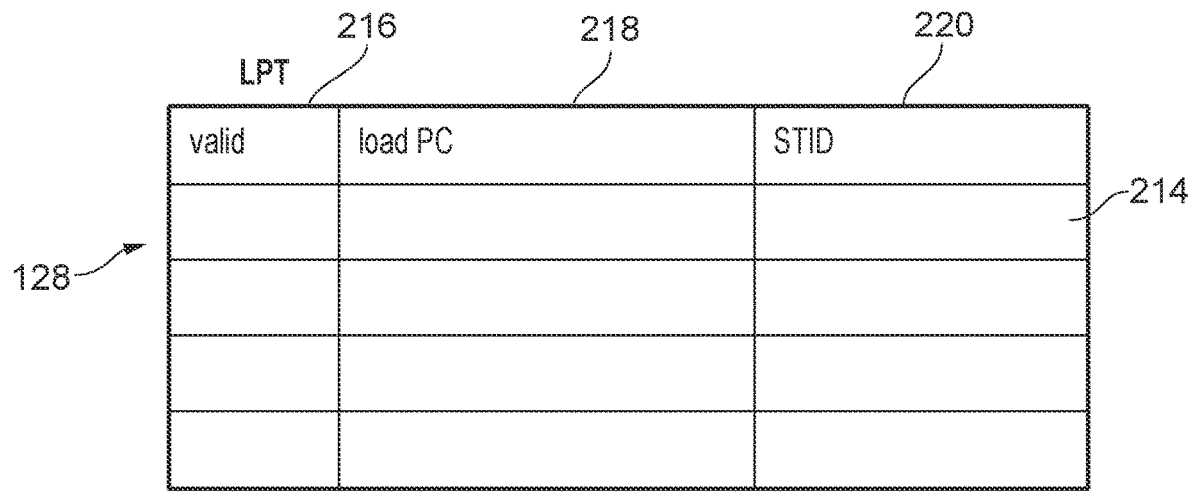
FIG. 8 schematically illustrates a load prediction table.

FIG. 8 schematically illustrates the load prediction table (LPT) 128. The LPT contains LPT entries 214, each LPT entry 214 corresponding to one load operation for which the youngest corresponding entry was a slow entry 142 that failed to satisfy a forwarding condition and therefore caused a pipeline flush.

Each LPT entry contains a valid field 216, a load PC field 218, and a STID field 220. The valid field 216 indicates whether the LPT entry 214 contains valid information. The load program counter (PC) field 218 provides a mechanism to associate issued load operations with previously issued load operations by storing the value of the program counter associated with the previously issued load operation associated with a given LPT entry 214. In response to a load operation, the processing circuitry 4 is able to determine whether the load operation is the same load operation that previously caused a pipeline flush by comparing the load PC of the issued load operation to the load PC field of the LPT. The LPT entries 214 also comprise a STID field 220. The STID field 220 identifies the slow entry 142 that failed to satisfy a forwarding condition which caused the LPT entry 214 to be allocated. Hence, LPT entries 214 can be managed based on the STID field 220. For example, an LPT entry 214 may be deallocated once it is determined that the slow entry 142 (with the STID stored in the STID field) that failed to satisfy a forwarding condition has been deallocated from the store buffer or has been transferred to a fast entry 140, based on a comparison of the deallocation pointer and the STID stored in the LPT entry. Therefore the STID field 220 provides a mechanism of associating store buffer entries with LPT entries 214.

Figure 9:
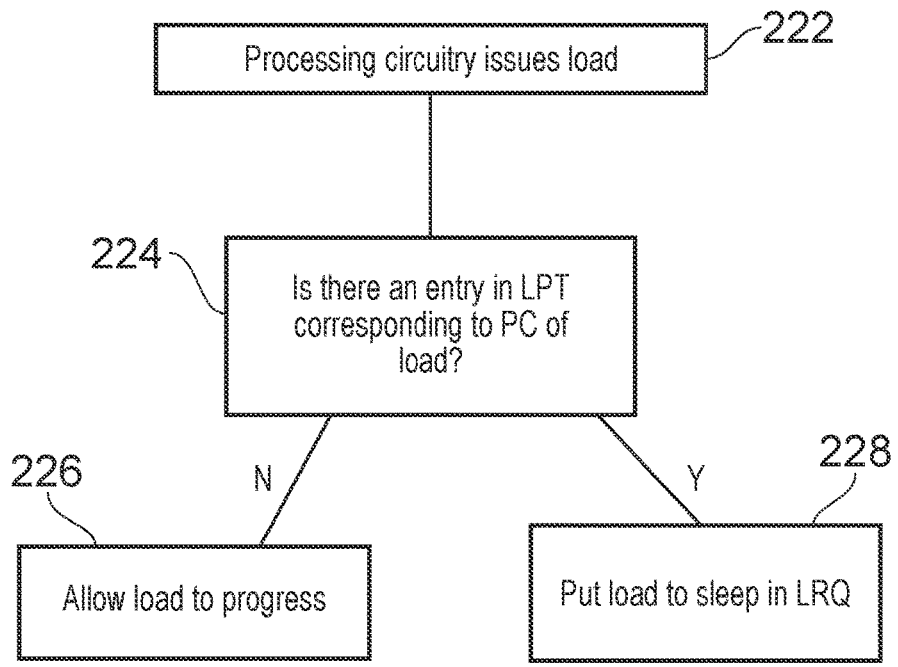
FIG. 9 illustrates a process of using a load prediction table to delay executing load operations.

FIG. 9 illustrates a process of using the LPT 128 to delay issuing load operations that correspond to an LPT entry 214.

At step 222 the processing circuitry 4 issues a load operation having a particular program counter value (the load PC value). At step 224 the LPT is looked up to determine whether any valid LPT entry 214 has a load PC field 218 matching the load PC value.

If no valid and matching LPT entry 214 is found, the load operation is not predicted to cause a pipeline flush and may be allowed to progress (for example, to step 166 of FIG. 6). It will be appreciated that the load operation may go on to cause a pipeline flush, but this could not be predicted using the LPT mechanism if it had not occurred previously.

However, if a matching LPT entry 214 is found, the load operation has previously hit against a slow entry 142 that failed to satisfy the forwarding condition and caused a pipeline flush. Therefore, it may be likely that a pipeline flush will happen again if the load operation is allowed to progress. Hence, the processing circuitry 4 signals that the load operation is to be replayed and the load operation is placed in the LRQ 124.

The load operation may be allowed to progress from the LRQ 124 after a predetermined period of time, after which it is expected that the slow entry 142 failing to satisfy the forwarding condition has left the store buffer 122 or moved to a fast entry 140. Alternatively, when the slow entry 142 failing to satisfy the forwarding condition is deallocated from the store buffer 122 or is transferred to a fast entry 140, circuitry may signal to the LRQ 124 that the entry has been moved, and the stalled load operations stalled due to an LPT entry 214 with the same STID in the STID field 220 as the deallocated/transferred slow entry 142 may be allowed to progress.

Figure 10:
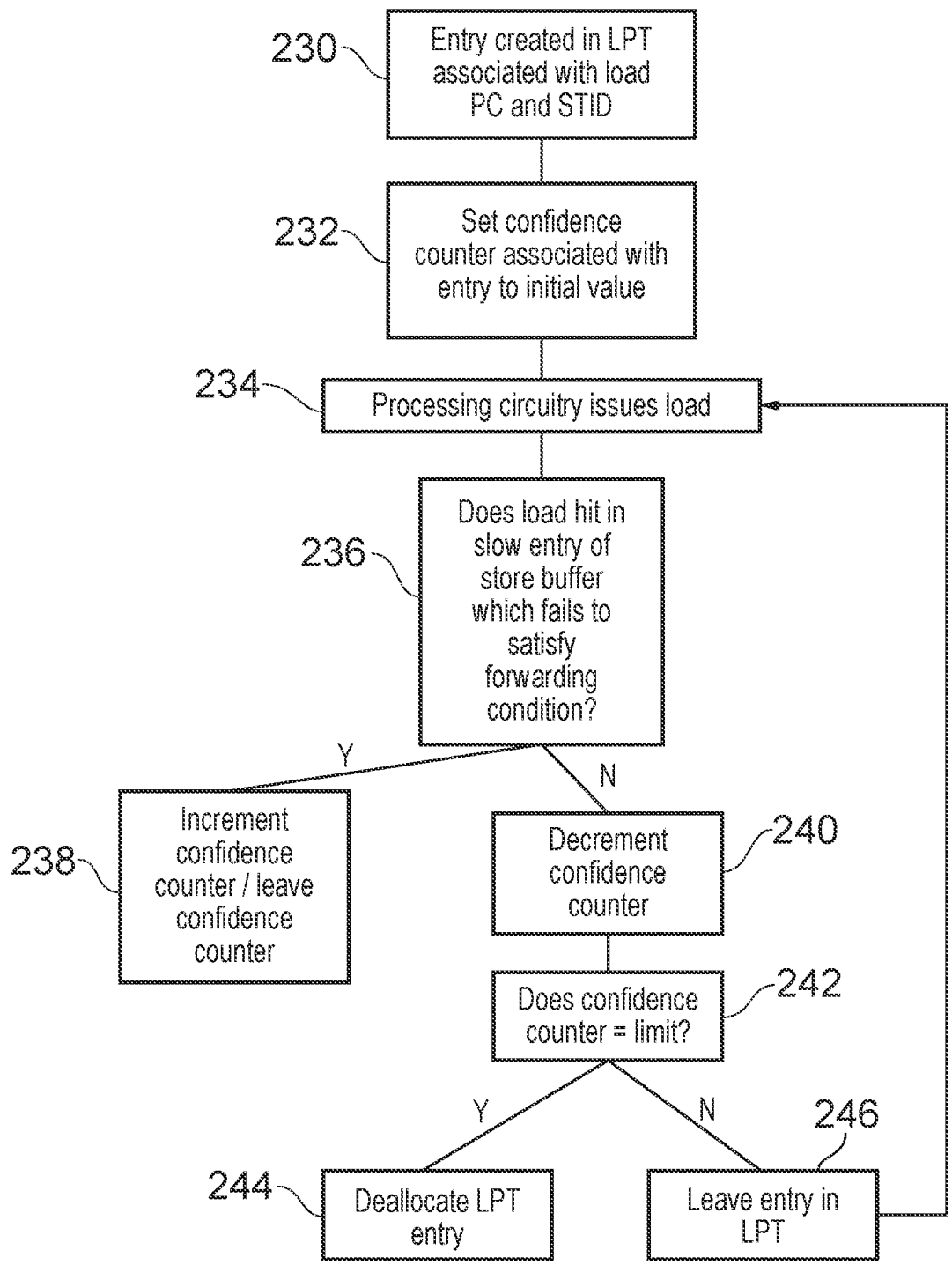
FIG. 10 illustrates a process of managing entries in a load prediction table.

FIG. 10 illustrates a process of managing entries in the LPT 128.

At step 230, an entry is created in the LPT 128, associated with a particular load PC value and STID value. The entry may be allocated due to a load operation that hits against a slow entry 142 in the store buffer 122 where the slow entry 142 fails to satisfy the forwarding condition (as in step 190 of FIG. 6). The load PC field 218 is filled with the PC of the load operation and the STID field 220 is filled with the STID of the store buffer entry that failed to satisfy the forwarding condition.

At step 232, a confidence counter associated with the LPT entry 214 is initialised to an initial value.

As processing continues, the processing circuitry 4 issues further load operations at step 234. At step 236 load buffer lookup circuitry 123 determines whether the load issued at step 234 hits against the slow entry 142 of the store buffer which fails to satisfy the forwarding condition with the STID stored in the LPT entry 214. If so, it can be determined that the slow entry 142 is still in the store buffer 122 and the confidence counter can either be incremented or left at the same value as it was previously. If the load operation does not hit against the slow entry 142 of the store buffer the confidence counter is decremented at step 240. It is determined at step 242 whether the decremented confidence counter value equals a threshold confidence counter value. If the threshold is met, the LPT entry 214 is deallocated at step 244 as it is less likely that load operations at the particular load PC will cause a pipeline flush due to hitting against the slow entry 142. If the threshold is not met, the LPT entry 214 is left in the LPT 128 and the process returns to step 234.

Figure 11:
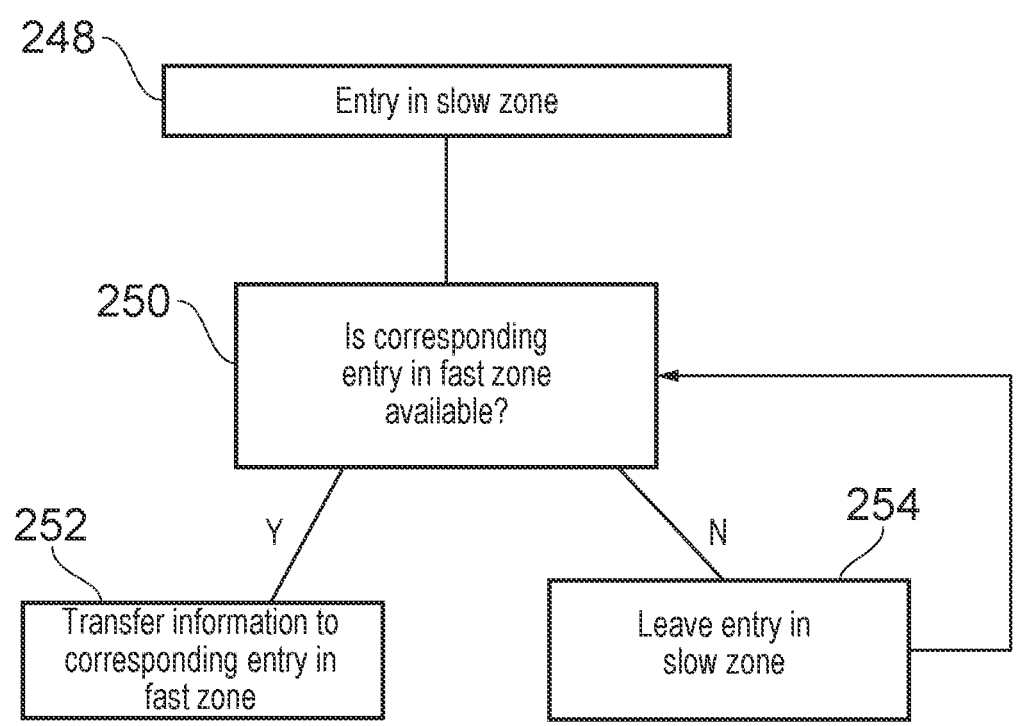
FIG. 11 illustrates a process of transferring entries from slow entries to fast entries within the store buffer of FIG. 3.

FIG. 11 illustrates the process of transferring entries from slow entries to fast entries within the store buffer 122.

At step 248 a given store buffer entry is a slow entry 142, having a corresponding fast entry 140 sharing the same non-wrap STID bits.

At step 250 the store buffer lookup circuitry 123 determines whether the corresponding fast entry 140 is available by, for example, determining the state of the fast entry 140 valid bit(s) 132. Alternatively, it could be determined that the corresponding fast entry 140 is available when the deallocation pointer moves from the corresponding fast entry 140 to a further entry.

If the corresponding fast entry 140 of the store buffer is available, then at step 252 the information stored in the slow entry 142 is transferred to the corresponding fast entry 140. If the corresponding fast entry 140 is not available, then at step 254 the information stored in the slow entry 142 remains in the slow entry 142 and the process returns to step 250.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Additionally, examples of the present technique may be configured as below.

(1) An apparatus comprising:
  processing circuitry to issue store operations to store data to a data store and load operations to load data from the data store;
  a store buffer comprising entries to store entry information corresponding to store operations in advance of the store operations completing; and
  store buffer lookup circuitry to lookup, in response to a load operation, whether the store buffer contains a corresponding entry corresponding to an older store operation for which target addresses of the load operation and the older store operation satisfy an address comparison condition; in which:
  the store buffer lookup circuitry is configured to perform store-to-load forwarding in response to the load operation when the corresponding entry is a first type of store buffer entry and the corresponding entry satisfies a forwarding condition; and
  the store buffer lookup circuitry is configured to delay processing of the load operation when the corresponding entry is a second type of store buffer entry and the corresponding entry satisfies the forwarding condition.

(2) The apparatus according to (1), in which:
  the store buffer lookup circuitry is configured to replay the load operation when the corresponding entry is the second type of store buffer entry and the corresponding entry satisfies the forwarding condition.

(3) The apparatus according to (2), in which:
  in response to a replayed load operation replayed due to the corresponding entry being the second type of store buffer entry that satisfies the forwarding condition, the store buffer lookup circuitry is configured to determine whether the store buffer contains a corresponding-on-replay entry which corresponds to an older store operation for which target addresses of the replayed load operation and the older store operation satisfy an address comparison condition.

(4) The apparatus according to (3), in which:
  the store buffer lookup circuitry is configured to perform store-to-load forwarding in response to the replayed load operation when the youngest corresponding-on-replay entry corresponds to the same older store operation as the corresponding entry of the second type which caused the load operation to be replayed.

(5) The apparatus according to any of (3) or (4), in which:
  the store buffer lookup circuitry is configured to enable load data to be returned from the data store in response to the replayed load operation when the store buffer does not contain a corresponding-on-replay entry.

(6) The apparatus according to any of (4) to (5), wherein:
  the store buffer lookup circuitry is configured to determine whether the store buffer contains an entry corresponding to the same older store operation as the corresponding entry of the second type which caused the load operation to be replayed by comparing at least a subset of identifying information that was stored about the corresponding entry in response to the load operation for which processing was replayed against at least a subset of entry information corresponding to at least one store buffer entry of the second type, and when the compared information matches, determine that the store buffer contains an entry corresponding to the same older store operation as the corresponding entry of the second type which caused the load operation to be replayed.

(7) The apparatus according to any of (2) to (6), in which:
  when the corresponding entry is the second type of store buffer entry, the store buffer lookup circuitry is configured to determine whether the corresponding entry satisfies the forwarding condition after signalling that the load operation is to be replayed; and
  the store buffer lookup circuitry is configured to issue a flush operation to flush the load operation and younger operations from the processing circuitry when the forwarding condition is not satisfied.

(8) The apparatus according to (7), in which the processing circuitry is configured to:
  store flushed load identifying information identifying the flushed load operation and the older store operation corresponding to the store buffer entry of the second type that fails to satisfy the forwarding condition; and
  use the stored flushed load identifying information to defer processing of a reissued load operation corresponding to the flushed load operation until either an entry corresponding to the older store operation is no longer in the store buffer or the older store operation is allocated to a first type of store buffer entry.

(9) The apparatus according to any of (1) to (8), in which:
  each store buffer entry of the second type is associated with a corresponding store buffer entry of the first type.

(10) The apparatus according to (9), in which:
 entries in the store buffer are identified by a store buffer identifier comprising a contiguous number of wrap bits and a contiguous number of non-wrap bits, wherein store buffer entries are indexed using the non-wrap bits; and
 corresponding store buffer entries of the first and second types have store buffer identifiers with identical non-wrap bits.
(11) The apparatus according to any of (9) or (10), in which:
 the store buffer lookup circuitry is configured to transfer entry information stored in a store buffer entry of the second type to the corresponding store buffer entry of the first type when the corresponding store buffer entry of the first type becomes available.
(12) The apparatus according to any of (1) to (11), in which:
 the store buffer comprises an equal number of entries of the first type and entries of the second type.
(13) The apparatus according to any of (1) to (12), in which:
 circuitry configured to determine whether the second type of store buffer entry satisfies the forwarding condition returns a determination either:
  at a later stage in a processing pipeline than circuitry configured to determine whether the first type of store buffer entry satisfies the forwarding condition, or
  at a later point within the same stage in the processing pipeline as the circuitry configured to determine whether the first type of store buffer entry satisfies the forwarding condition.
(14) The apparatus according to any of (1) to (13), in which:
 the forwarding condition includes at least an address alignment condition dependent on alignment between the target addresses of the load operation and the older store operation.
(15) The apparatus according to any of (1) to (14), in which:
 the store buffer lookup circuitry is configured to delay processing of the load operation when the corresponding entry is the first type of store buffer entry and the corresponding entry fails to satisfy the forwarding condition.
(16) The apparatus according to (15), in which:
 the store buffer lookup circuitry is configured to replay the load operation replayed due to the corresponding entry being the first type of store buffer entry that fails to satisfy the forwarding condition.
(17) The apparatus according to (16), in which in response to the replayed load operation when the corresponding entry is the first type of store buffer entry:
 the store buffer lookup circuitry is configured to enable load data to be returned from the data store when an entry corresponding to the older store operation is no longer in the store buffer and there is no other entry corresponding to another store operation older than the replayed load operation, for which target addresses of the replayed load operation and the other older store operation satisfy an address comparison condition; and
 the store buffer lookup circuitry is configured to replay again the replayed load operation when an entry corresponding to the older store operation is still in the store buffer.
(18) A method comprising:
 issuing store operations to store data to a data store and load operations to load data from the data store;
 storing, in a store buffer, entry information corresponding to store operations in advance of the store operations completing; and
 looking up, in response to a load operation, whether the store buffer contains a corresponding entry corresponding to an older store operation for which target addresses of the load operation and the older store operation satisfy an address comparison condition;
 performing store-to-load forwarding in response to the load operation when the corresponding entry is a first type of store buffer entry and the corresponding entry satisfies a forwarding condition; and
 delaying processing of the load operation when the corresponding entry is a second type of store buffer entry and the corresponding entry satisfies the forwarding condition.
(19) A non-transitory computer-readable medium to store computer-readable code for fabrication of an apparatus comprising:
 processing circuitry to issue store operations to store data to a data store and load operations to load data from the data store;
 a store buffer comprising entries to store entry information corresponding to store operations in advance of the store operations completing; and
 store buffer lookup circuitry to lookup, in response to a load operation, whether the store buffer contains a corresponding entry corresponding to an older store operation for which target addresses of the load operation and the older store operation satisfy an address comparison condition; in which:
 the store buffer lookup circuitry is configured to perform store-to-load forwarding in response to the load operation when the corresponding entry is a first type of store buffer entry and the corresponding entry satisfies a forwarding condition; and
 the store buffer lookup circuitry is configured to delay processing of the load operation when the corresponding entry is a second type of store buffer entry and the corresponding entry satisfies the forwarding condition.

The invention claimed is:
1. An apparatus comprising:
 processing circuitry configured to issue store operations to store items of store data to a data store and load operations to load items of load data from the data store;
 a store buffer comprising entries configured to store entry information corresponding to the store operations in advance of the store operations completing, the store buffer comprising a first zone and a second zone; and
 store buffer lookup circuitry configured to look up, in response to a load operation of the load operations, whether the store buffer contains a corresponding entry corresponding to an older store operation for which target addresses of the load operation and the older store operation satisfy an address comparison condition; in which:
 the store buffer lookup circuitry is configured to perform store-to-load forwarding in response to the load operation in response to determining that the corresponding entry is a first type of store buffer entry and the corresponding entry satisfies a forwarding condition; and
 the store buffer lookup circuitry is configured to delay processing of the load operation in response to determining that the corresponding entry is a second type of store buffer entry and the corresponding entry satisfies the forwarding condition;
 wherein determining whether the corresponding entry is the first type of store buffer entry or the second type of store buffer entry comprises determining whether the corresponding entry is in the first zone or the second zone.

2. The apparatus according to claim 1, in which:
the store buffer lookup circuitry is configured to replay the load operation when the corresponding entry is the second type of store buffer entry and the corresponding entry satisfies the forwarding condition.

3. The apparatus according to claim 2, in which:
in response to a replayed load operation replayed due to the corresponding entry being the second type of store buffer entry that satisfies the forwarding condition, the store buffer lookup circuitry is configured to determine whether the store buffer contains a corresponding-on-replay entry which corresponds to an older store operation for which target addresses of the replayed load operation and the older store operation satisfy an address comparison condition.

4. The apparatus according to claim 3, in which:
the store buffer lookup circuitry is configured to perform store-to-load forwarding in response to the replayed load operation when a youngest corresponding-on-replay entry corresponds to a same older store operation as the corresponding entry of the second type which caused the load operation to be replayed.

5. The apparatus according to claim 3, in which:
the store buffer lookup circuitry is configured to enable load data to be returned from the data store in response to the replayed load operation when the store buffer does not contain a corresponding-on-replay entry.

6. The apparatus according to claim 4, wherein:
the store buffer lookup circuitry is configured to determine whether the store buffer contains an entry corresponding to the same older store operation as the corresponding entry of the second type which caused the load operation to be replayed by comparing at least a subset of identifying information that was stored about the corresponding entry in response to the load operation for which processing was replayed against at least a subset of entry information corresponding to at least one store buffer entry of the second type, and when the compared information matches, determine that the store buffer contains an entry corresponding to the same older store operation as the corresponding entry of the second type which caused the load operation to be replayed.

7. The apparatus according to claim 2, in which:
when the corresponding entry is the second type of store buffer entry, the store buffer lookup circuitry is configured to determine whether the corresponding entry satisfies the forwarding condition after signalling that the load operation is to be replayed; and
the store buffer lookup circuitry is configured to issue a flush operation to flush the load operation and younger operations, later in program order than the load operation, from the processing circuitry when the forwarding condition is not satisfied.

8. The apparatus according to claim 7, in which the processing circuitry is configured to:
store flushed load identifying information identifying the flushed load operation and the older store operation corresponding to the store buffer entry of the second type that fails to satisfy the forwarding condition; and
use the stored flushed load identifying information to defer processing of a reissued load operation corresponding to the flushed load operation until either an entry corresponding to the older store operation is no longer in the store buffer or the older store operation is allocated to a first type of store buffer entry.

9. The apparatus according to claim 1, in which:
each store buffer entry of the second type is associated with a corresponding store buffer entry of the first type.

10. The apparatus according to claim 9, in which:
entries in the store buffer are identified by a store buffer identifier comprising a contiguous number of wrap bits and a contiguous number of non-wrap bits, wherein
store buffer entries are indexed using the non-wrap bits; and
corresponding store buffer entries of the first and second types have store buffer identifiers with identical non-wrap bits.

11. The apparatus according to claim 9, in which:
the store buffer lookup circuitry is configured to transfer entry information stored in a store buffer entry of the second type to the corresponding store buffer entry of the first type when the corresponding store buffer entry of the first type becomes available.

12. The apparatus according to claim 1, in which:
the store buffer comprises an equal number of entries of the first type and entries of the second type.

13. The apparatus according to claim 1, in which:
circuitry configured to determine whether the second type of store buffer entry satisfies the forwarding condition returns a determination either:
at a later stage in a processing pipeline than circuitry configured to determine whether the first type of store buffer entry satisfies the forwarding condition, or
at a later point within the same stage in the processing pipeline as the circuitry configured to determine whether the first type of store buffer entry satisfies the forwarding condition.

14. The apparatus according to claim 1, in which:
the forwarding condition includes at least an address alignment condition dependent on alignment between the target addresses of the load operation and the older store operation.

15. The apparatus according to claim 1, in which:
the store buffer lookup circuitry is configured to delay processing of the load operation when the corresponding entry is the first type of store buffer entry and the corresponding entry fails to satisfy the forwarding condition.

16. The apparatus according to claim 15, in which:
the store buffer lookup circuitry is configured to replay the load operation replayed due to the corresponding entry being the first type of store buffer entry that fails to satisfy the forwarding condition.

17. The apparatus according to claim 16, in which in response to the replayed load operation when the corresponding entry is the first type of store buffer entry:
the store buffer lookup circuitry is configured to enable load data to be returned from the data store when an entry corresponding to the older store operation is no longer in the store buffer and there is no other entry corresponding to another store operation older than the replayed load operation, for which target addresses of the replayed load operation and the other older store operation satisfy an address comparison condition; and
the store buffer lookup circuitry is configured to replay again the replayed load operation when an entry corresponding to the older store operation is still in the store buffer.

18. A method comprising:
issuing store operations to store items of store data to a data store and load operations to load items of load data from the data store;
storing, in a store buffer, entry information corresponding to the store operations in advance of the store operations completing, the store buffer comprising a first zone and a second zone; and
looking up, in response to a load operation of the load operations, whether the store buffer contains a corresponding entry corresponding to an older store operation for which target addresses of the load operation and the older store operation satisfy an address comparison condition;
performing store-to-load forwarding in response to the load operation in response to determining that the corresponding entry is a first type of store buffer entry and the corresponding entry satisfies a forwarding condition; and
delaying processing of the load operation in response to determining that the corresponding entry is a second type of store buffer entry and the corresponding entry satisfies the forwarding condition;
wherein determining whether the corresponding entry is the first type of store buffer entry or the second type of store buffer entry comprises determining whether the corresponding entry is in the first zone or the second zone.

19. A non-transitory computer-readable medium to store computer-readable code for fabrication of an apparatus comprising:

processing circuitry configured to issue store operations to store items of store data to a data store and load operations to load items of load data from the data store;
a store buffer comprising entries configured to store entry information corresponding to the store operations in advance of the store operations completing, the store buffer comprising a first zone and a second zone; and
store buffer lookup circuitry configured to lookup, in response to a load operation of the load operations, whether the store buffer contains a corresponding entry corresponding to an older store operation for which target addresses of the load operation and the older store operation satisfy an address comparison condition; in which:
the store buffer lookup circuitry is configured to perform store-to-load forwarding in response to the load operation in response to determining that the corresponding entry is a first type of store buffer entry and the corresponding entry satisfies a forwarding condition; and
the store buffer lookup circuitry is configured to delay processing of the load operation in response to determining that the corresponding entry is a second type of store buffer entry and the corresponding entry satisfies the forwarding condition;
wherein determining whether the corresponding entry is the first type of store buffer entry or the second type of store buffer entry comprises determining whether the corresponding entry is in the first zone or the second zone.

* * * * *